(12) United States Patent
Stock et al.

(10) Patent No.: US 11,981,873 B2
(45) Date of Patent: May 14, 2024

(54) TORQUE VECTORING FOR UTILITY VEHICLES

(71) Applicant: Polaris Industries Inc., Medina, MN (US)

(72) Inventors: Jacob L. Stock, Dellwood, MN (US); Alex R. Scheuerell, Wyoming, MN (US); Jonathon P. Graus, Stacy, MN (US); Evan R. Wozniak, Coon Rapids, MN (US); David F. Buehler, Bern (CH); Ronald Zurbruegg, Spiez (CH); Markus Hoffet, Aarberg (CH); Yassin M. Kelay, Freiburg (CH); Patrick J. McArdle, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/232,739

(22) Filed: Apr. 16, 2021

(65) Prior Publication Data

US 2021/0323402 A1    Oct. 21, 2021

Related U.S. Application Data

(60) Provisional application No. 63/011,364, filed on Apr. 17, 2020.

(51) Int. Cl.
*B60K 17/348* (2006.01)
*B01D 53/14* (2006.01)
(Continued)

(52) U.S. Cl.
CPC ......... *C10G 55/06* (2013.01); *B01D 53/1418* (2013.01); *B01D 53/1425* (2013.01);
(Continued)

(58) Field of Classification Search
CPC .............. C10G 55/06; C10G 2300/706; B01D 53/1418; B01D 53/1425; B01D 53/185;
(Continued)

(56) References Cited

U.S. PATENT DOCUMENTS 6,830,122 B2    12/2004   Kroppe
9,045,141 B2 *   6/2015   Dehren ................. B60T 8/1764
(Continued)

FOREIGN PATENT DOCUMENTS

CN        206797103 U   * 12/2017
CN        114040855       2/2022
(Continued)

OTHER PUBLICATIONS

International Preliminary Report on Patentability as issued by the International Preliminary Examining Authority, dated Apr. 13, 2022, for International Patent Application No. PCT/US2021/027701; 22 pages.
(Continued)

*Primary Examiner* — Justin Holmes
(74) *Attorney, Agent, or Firm* — Faegre Drinker Biddle & Reath LLP

(57) ABSTRACT

A utility vehicle is configured for independently controlling torque at each of the ground-engaging members.

23 Claims, 39 Drawing Sheets

(51) Int. Cl.
   *B01D 53/18*      (2006.01)
   *B01J 8/00*       (2006.01)
   *B01J 8/18*       (2006.01)
   *B01J 8/24*       (2006.01)
   *B60K 17/02*      (2006.01)
   *B60K 17/24*      (2006.01)
   *B60K 17/356*     (2006.01)
   *B60K 23/08*      (2006.01)
   *C10G 55/06*      (2006.01)
   *B60K 23/04*      (2006.01)

(52) U.S. Cl.
   CPC ............ *B01D 53/185* (2013.01); *B01J 8/006* (2013.01); *B01J 8/1863* (2013.01); *B01J 8/24* (2013.01); *B60K 17/02* (2013.01); *B60K 17/24* (2013.01); *B60K 17/348* (2013.01); *B60K 17/356* (2013.01); *B60K 23/0808* (2013.01); *B01D 2252/00* (2013.01); *B01J 2208/00761* (2013.01); *B60K 2023/046* (2013.01); *B60K 2023/0816* (2013.01); *C10G 2300/706* (2013.01)

(58) Field of Classification Search
   CPC ..... B01D 2252/00; B01J 8/006; B01J 8/1863; B01J 8/24; B01J 2208/00761; B60K 17/02; B60K 17/24; B60K 17/348; B60K 17/356; B60K 23/0808; B60K 2023/046; B60K 2023/0816; B60K 2023/043; B60K 2023/085; B60K 17/3462; B60Y 2400/804; B60Y 2300/82
   See application file for complete search history.

(56) References Cited

U.S. PATENT DOCUMENTS

| | | | |
|---|---|---|---|
| 9,446,663 B2 * | 9/2016 | Wager | B60K 17/02 |
| 9,598,068 B2 | 3/2017 | Maeda | |
| 9,630,492 B2 | 4/2017 | Onitake | |
| 9,862,270 B2 | 1/2018 | Maeda | |
| 9,878,614 B1 | 1/2018 | Dunne, Jr. | |
| 10,293,687 B2 | 5/2019 | Nozu | |
| 10,654,360 B2 | 5/2020 | Niimi | |
| 10,836,252 B2 | 11/2020 | Dumas | |
| 10,962,097 B2 | 3/2021 | Dumas | |
| 11,097,740 B2 | 8/2021 | Shimizu | |
| 11,378,167 B2 | 7/2022 | Dumas | |
| 11,383,599 B2 | 7/2022 | Dumas | |
| 11,674,578 B2 | 6/2023 | Dumas | |
| 2011/0024222 A1 | 2/2011 | Honzek | |
| 2014/0058643 A1 | 2/2014 | Kodama | |
| 2014/0297150 A1 * | 10/2014 | Ohyagi | B60K 17/3505 701/89 |
| 2015/0251541 A1 | 9/2015 | Drako | |
| 2017/0253144 A1 | 9/2017 | Arima | |
| 2018/0326846 A1 | 11/2018 | Soto | |
| 2019/0275994 A1 | 9/2019 | Zhao | |
| 2020/0094896 A1 | 3/2020 | Nolin | |

FOREIGN PATENT DOCUMENTS

| | | | |
|---|---|---|---|
| DE | 8807664 | 8/1988 | |
| DE | 102009045852 A1 * | 4/2011 | ......... B60K 23/0808 |
| DE | 102010045502 | 3/2012 | |
| EP | 3321118 | 5/2018 | |
| WO | WO-2018057899 A1 * | 3/2018 | ............. B60K 17/16 |

OTHER PUBLICATIONS

International Search Report and Written Opinion of the International Searching Authority, dated Jul. 14, 2021, for International Patent Application No. PCT/US2021/027701; 21 pages.

Extended European Search Report issued by the European Patent Office, dated Mar. 22, 2024, for European Patent Application No. 21788001.2; 10 pages.

* cited by examiner

TORQUE VECTORING FOR UTILITY VEHICLES

CROSS-REFERENCE TO RELATED APPLICATION

The present application claims priority to U.S. Provisional Patent Application Ser. No. 63/011,364, filed Apr. 17, 2020, the complete disclosure of which is expressly incorporated by reference herein.

FIELD OF THE DISCLOSURE

The present application relates to driveline configurations for utility vehicles and, more particularly, to torque vectoring for utility vehicles.

BACKGROUND OF THE DISCLOSURE

Vehicles configured for off-road travel, such as utility vehicles and all-terrain vehicles, may have two-wheel drive ("2WD") or four-wheel/all-wheel drive ("4WD" or "AWD") capabilities. It may be desirable to individually control torque to each wheel in both the two-wheel drive and four-wheel drive modes. Various automotive (i.e., on-road) vehicles are known to control torque between the left and right wheels, however, it may be desirable to apply torque vectoring and control to off-road vehicles and to control torque between the left and right wheels and between the front and rear wheels for increased handling, stability, assistance with steering, etc. Therefore, there is a need to provide an off-road vehicle with torque vectoring capabilities and to control torque independently at each wheel or other ground-engaging member.

SUMMARY OF THE DISCLOSURE

In one embodiment of the present disclosure, a utility vehicle comprises a first front ground-engaging member; a first axle operably coupled to the first front ground-engaging member; a second front ground-engaging member; a second axle operably coupled to the second front ground-engaging member and being axially aligned with the first axle; and at least one rear ground-engaging member. The utility vehicle further comprises a torque altering unit operably coupled to at least one of the first front ground-engaging member, the second front ground-engaging member, or the at least one rear ground-engaging member. Additionally, the utility vehicle comprises a control system configured to independently control torque output at each of the first front ground-engaging member, the second front ground-engaging member, and the at least one rear ground-engaging member.

In another embodiment of the present disclosure, a method of controlling torque for an off-road utility vehicle comprises controlling torque to a first ground-engaging member of the utility vehicle; controlling torque to a second ground-engaging member of the utility vehicle simultaneously with and independently of controlling torque to the first ground-engaging member; and controlling torque to a third ground-engaging member of the utility vehicle independently of controlling torque to the first and second ground-engaging members.

In a further embodiment of the present disclosure, a driveline assembly for a utility vehicle comprises a front differential configured to be operably coupled to at least one front ground-engaging member of the utility vehicle; a rear differential configured to be operably coupled to at least one rear ground-engaging member of the utility vehicle; and a control system operably coupled to the front and rear differentials. The control system is configured to control distribution of torque to each of front and rear ground-engaging members to affect steering of the utility vehicle.

In yet another embodiment of the present disclosure, a method of controlling torque for an off-road vehicle comprises controlling torque to a first ground-engaging member of the utility vehicle by providing a braking input at the first ground-engaging member, controlling torque to a second ground-engaging member of the utility vehicle simultaneously with and independently of controlling torque to the first ground-engaging member, and controlling torque to a third ground-engaging member of the utility vehicle independently of controlling torque to the first and second ground-engaging members.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
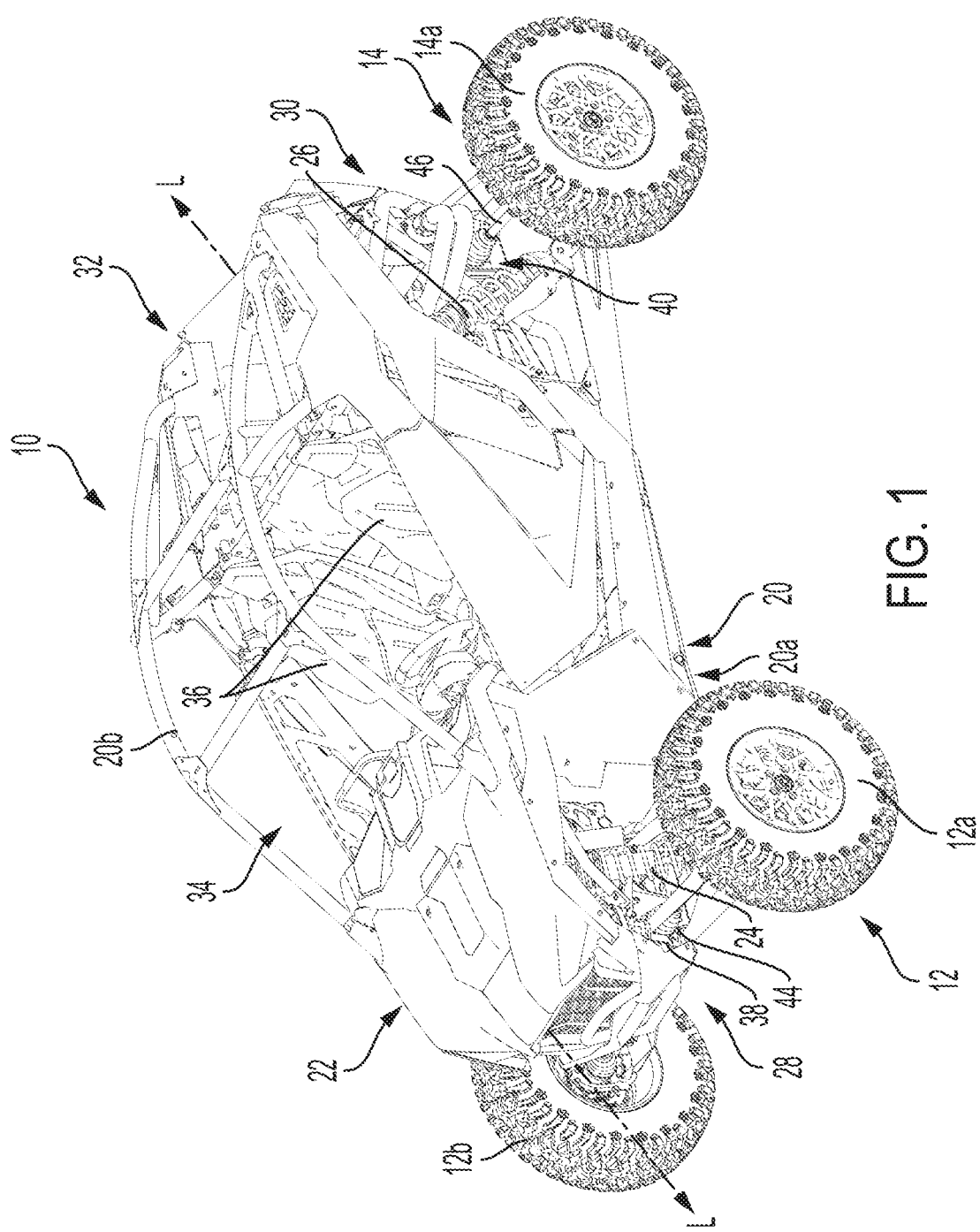
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 10 is shown which is configured to traverse a variety of off-road terrains, including mud, rocks, dirt, and other trail or off-road conditions. Vehicle 10 may be referred to as a utility vehicle ("UTV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Figure 3:
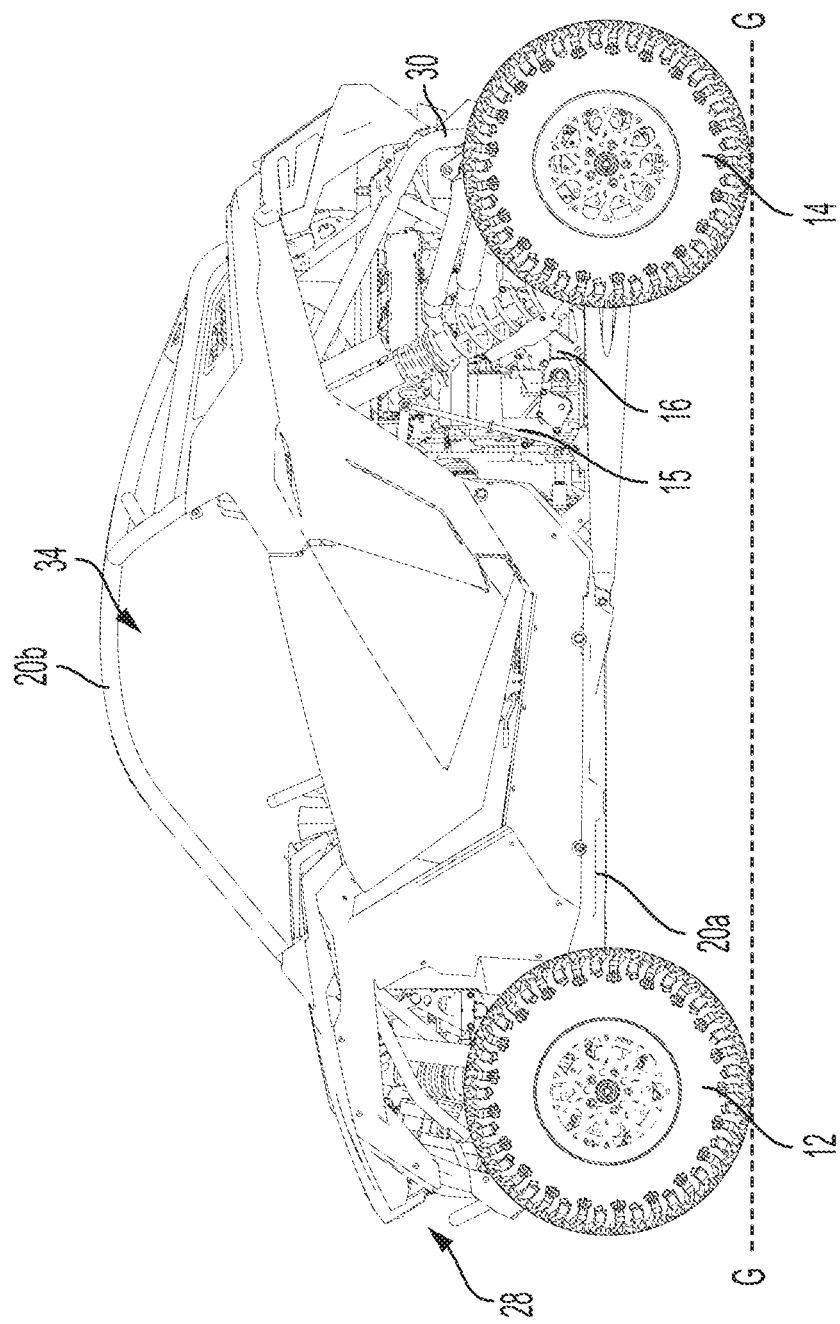
FIG. 3 is a left side view of the of the utility vehicle of FIG. 1.
Figure 4:
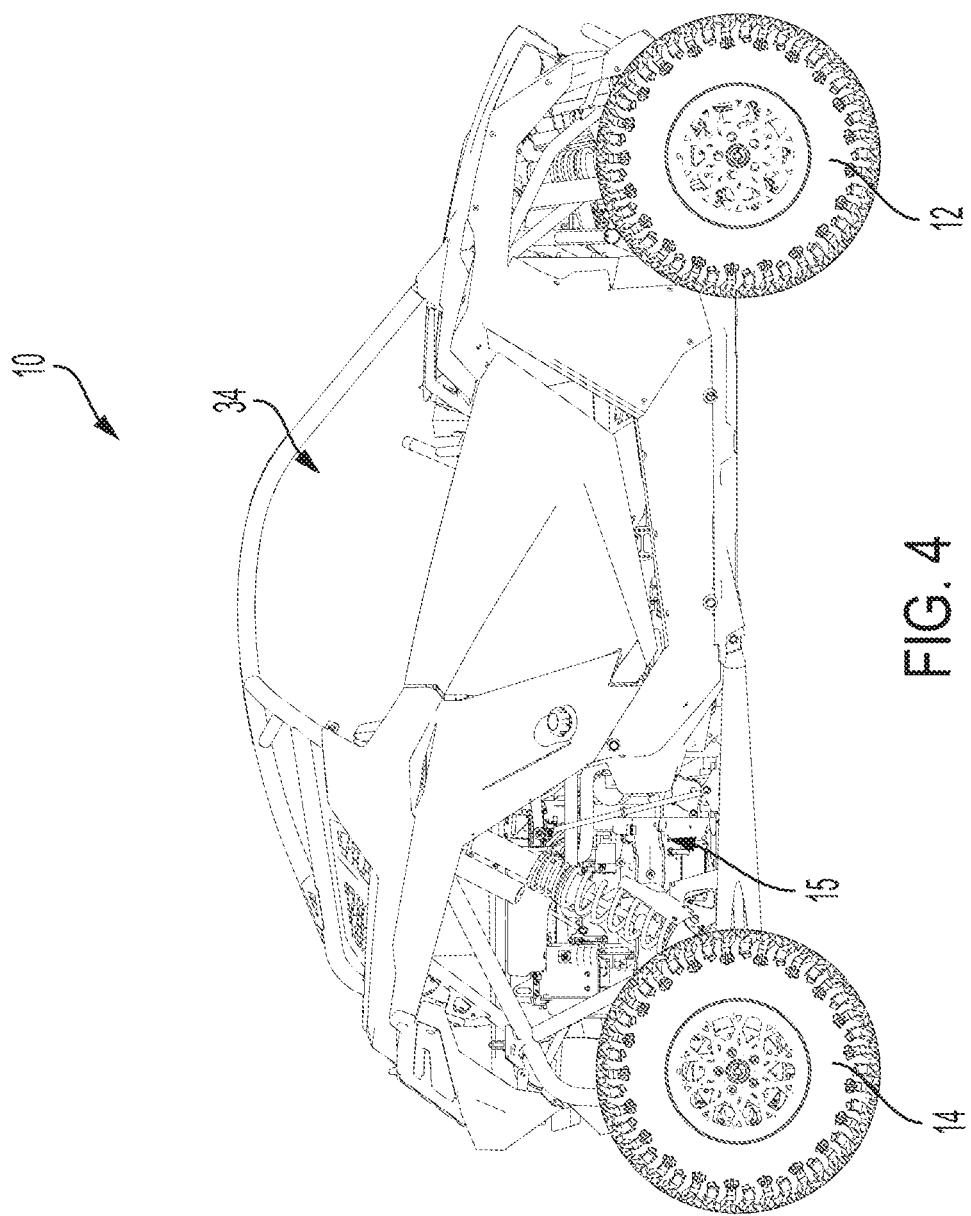
FIG. 4 is a right side view of the utility vehicle of FIG. 1.

Vehicle 10 includes a plurality of ground-engaging members, including front ground-engaging members 12 and rear-ground engaging members 14, a powertrain assembly 15, a driveline assembly 16, a frame assembly 20, a plurality of body panels 22 coupled to frame assembly 20, a front suspension assembly 24 supported by a front portion 28 of frame assembly 20, a rear suspension assembly 26 supported by a rear frame portion 30 of frame assembly 20, and a rear cargo area 32 supported by rear frame portion 30 of frame assembly 20. As shown in FIG. 1, vehicle 10 extends between front and rear ground-engaging members 12, 14 in a longitudinal direction along a longitudinal vehicle centerline L. More particularly, and as shown best in FIG. 3, frame assembly 20 is supported by front and rear ground-engaging members 12, 14 on a ground surface G and frame assembly 20 extends longitudinally between front and rear frame portions 28, 30 along longitudinal centerline L.

Frame assembly 20 includes a lower frame assembly 20a and an upper frame assembly 20b. Upper frame assembly 20b extends above lower frame assembly 20a and defines an upper boundary of an operator area 34 configured to support an operator and at least one passenger. Operator area 34 includes at least one seat 36, which may be a bench seat configured to support the operator and the passenger on the same seating surface, or may be bucket seats configured to individually support the operator and passenger. Operator area 34 also may include various operator inputs, such as a steering wheel, a gauge and/or display 90, a gear shifter, an accelerator pedal, a brake pedal, etc.

Additional details of vehicle 10 may be disclosed in U.S. patent application Ser. No. 14/051,700, filed Oct. 11, 2013); U.S. patent application Ser. No. 14/477,589, filed Sep. 4, 2014; and U.S. patent application Ser. No. 14/577,908, filed Dec. 19, 2014; the complete disclosures of which are expressly incorporated by reference herein.

Figure 8:
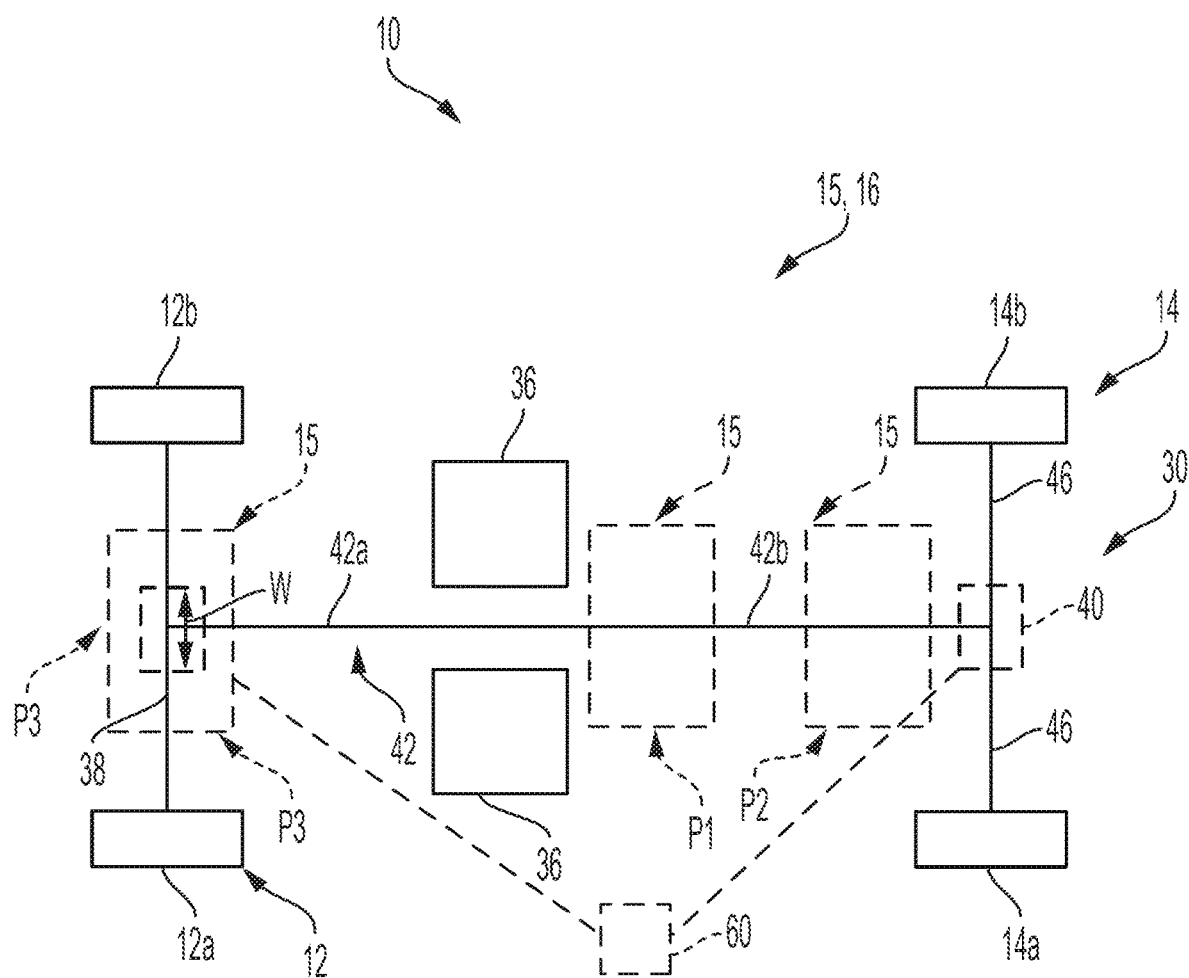
FIG. 8 is a schematic view of a powertrain assembly and a driveline assembly of the utility vehicle of FIG. 1.

Referring to FIG. 8, powertrain assembly 15 may be located at various positions on vehicle 10. For example, in one embodiment, powertrain assembly 15 may be positioned rearward of operator area 34 and at least partially rearward of seats 36 at a first position P1. In another embodiment, powertrain assembly 15 may be positioned at a rear extent of vehicle 10 and supported by rear frame portion 30 at a second position P2. The locations of first and second positions P1 and P2 define a rear-mounted powertrain assembly 15 and, more particularly, may include a rear-mounted engine of powertrain assembly 15. Additionally, powertrain assembly 15 may be positioned forward of seats 36 and at least partially forward of operator area 34 at a third position P3. In various embodiments of third position P3, at least a portion of powertrain assembly 15 may be positioned rearward of the front half shafts, forward of the front half shafts, or at the front half shafts. The location of third position P3 defines a front-mounted powertrain assembly 15 and, more particularly, may include a front-mounted engine of powertrain assembly 15.

Powertrain assembly 15 may be an electric powertrain, a fuel-based powertrain (gasoline, diesel, natural gas), or a hybrid powertrain. In one embodiment, powertrain assembly 15 includes a prime mover (e.g., an internal combustion engine) 50 (e.g., FIG. 10B) operably coupled to a transmission 52 (e.g., a rubber or steel belt continuously variable transmission, an automated sequential transmission, a shiftable transmission, or any other type of mechanism configured to provide various gear ratios and driving operations). At least a portion of powertrain assembly 15 is supported on frame assembly 20 and, more particularly, is supported on lower frame assembly 20a. A control system/assembly 60 or control unit 62 (FIG. 12) may be configured to control operation and parameters of powertrain assembly 15 and also may allow the operator to selectively adjust an operating mode of vehicle 10.

Referring still to FIG. 8, driveline assembly 16 is operably coupled to powertrain assembly 15 and may include a plurality of components, assemblies, or systems operably coupled to one or more of ground-engaging members 12, 14. For example, driveline assembly 16 may include a front differential or clutch/gear mechanism 38, a rear differential or clutch/gear mechanism 40, a prop shaft 42, and, in some embodiments, a center differential 48 (which may be integrated with a portion of transmission 52 in various embodiments requiring 4WD/AWD capability). Prop shaft 42 may be a one-piece or single prop shaft or, alternatively, may be at least a two-piece prop shafting defined by a front prop shaft portion 42a and a rear prop shaft portion 42b. Front differential or clutch/gear mechanism 38 is operably coupled to front ground-engaging members 12 through front half shafts or axles 44 and rear differential or clutch/gear mechanism 40 is operably coupled to rear ground-engaging members 14 through rear half shafts or axles 46. Front half shafts 44 are axially aligned with each other such that the rotational axes of half shafts 44 are colinear. Similarly, rear half shafts 46 are axially aligned with each other such that the rotational axes of half shafts 46 are colinear. As disclosed herein, driveline assembly 16 may be a fully electric driveline, a fully mechanical driveline, or a driveline comprised of mechanical and electrical systems and components.

Figure 12:
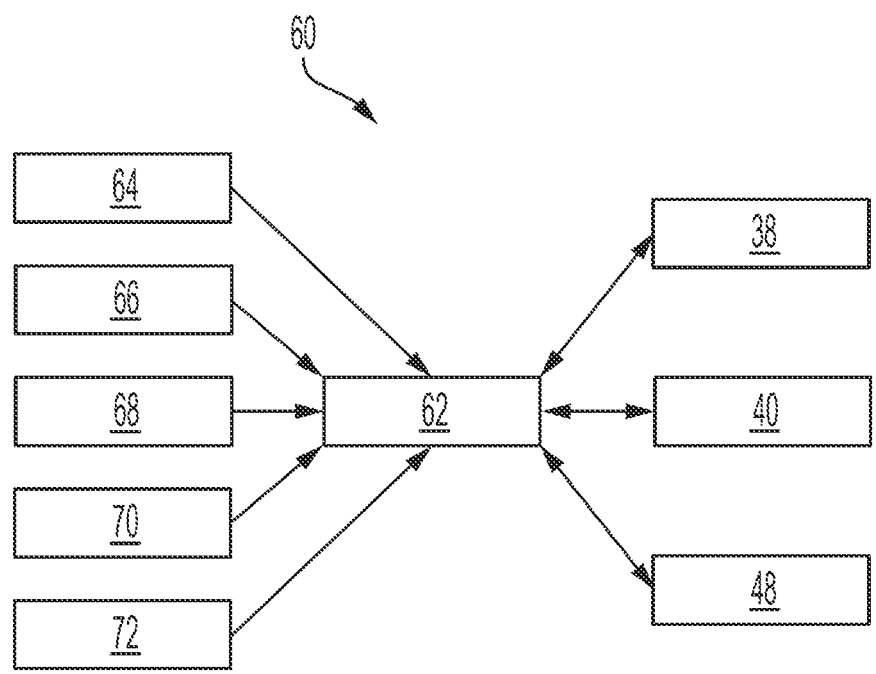
FIG. 12 is a schematic view of a control system of the vehicle of FIG. 1.

Front and rear differentials 38, 40 may be mechanical components or systems and are configured to be hydraulically, electronically, or otherwise controlled. For example, as shown in FIGS. 8 and 12, front and rear differentials 38, 40 may be operably coupled to control system 60 for controlling the torque provided to front and rear ground-engaging members 12, 14. In one embodiment, control system 60 is an electronic system/logic configured to control the flow of torque to front and rear ground-engaging members 12, 14.

More particularly, driveline assembly 16 is configured for controlling torque distribution (i.e., simultaneous torque split) from the prime mover (e.g., engine 50) to various ground-engaging members 12, 14 using various configurations of differentials and/or active, independent braking. It may be appreciated that torque distribution, as disclosed herein, relates to positive torque distribution (and/or corresponding braking) to any of ground-engaging members 12, 14 but does not relate to parasitic loss of engine torque. Past vehicles may have relied on rear ground-engaging members 14 to slip in order to send torque to front ground-engaging members 12 and include either a spool (i.e., no torque split) or a rear differential. For example, when operating prior art vehicles in 2WD, if a tire with an open differential lost traction, all power was sent to that wheel. However, as disclosed in the present disclosure, because vehicle 10 has torque distribution capabilities, logic may dictate where the power should go to provide the best handling.

Figure 9B:
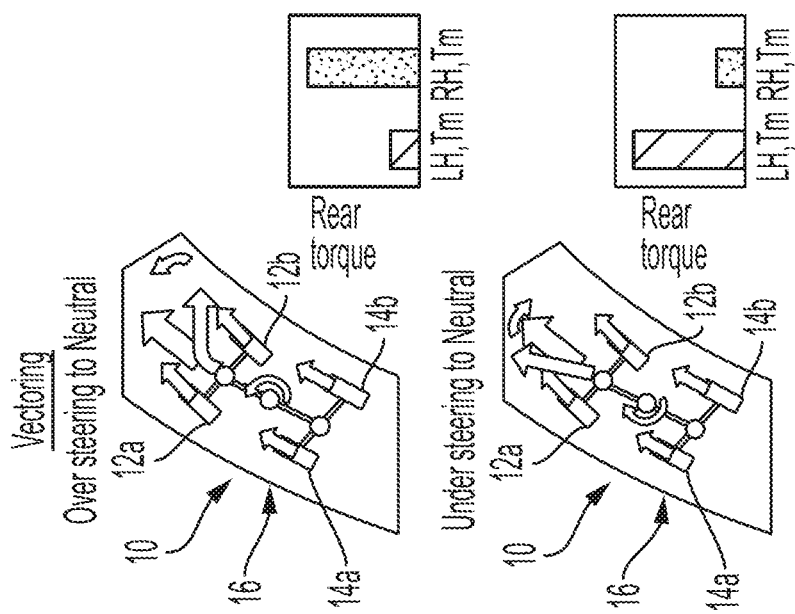
FIG. 9B is a schematic view of torque vectoring being used for a torque split between front and rear ground-engaging members of the vehicle of FIG. 1.
Figure 9A:
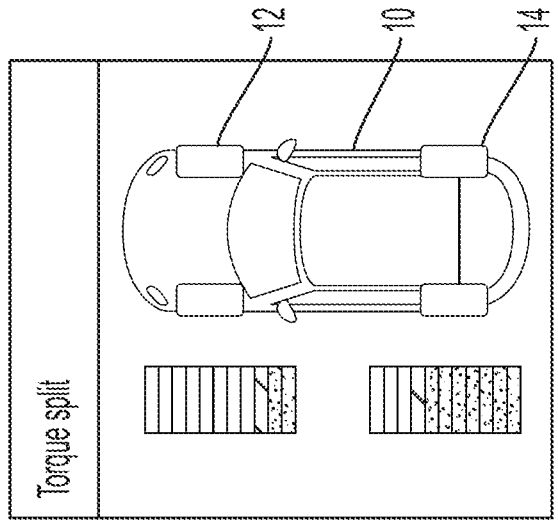
FIG. 9A is a schematic of torque vectoring being used to for adjusting oversteer and understeer situations to neutral.

During operation of vehicle 10, it may be desirable to control the torque/power output at each of ground-engaging members 12, 14 independently of the torque/power output of the other ground-engaging members 12, 14. Depending on various operating conditions, it may be desirable to control the power output at the front left ground-engaging member 12a independently of the power output at the front right ground-engaging member 12b and independently of the power output to any of rear ground-engaging member(s) 14 (e.g., rear left ground-engaging member 14a, and/or rear right ground-engaging member 14b in four-wheeled vehicles). For example, as shown in FIG. 9A varying levels of torque may be distributed to each ground-engaging member 12a, 12b, 14a, 14b during a right turn of vehicle 10. Additionally, as shown in FIG. 9B, varying levels of torque may be distributed between front ground-engaging members 12 and rear ground-engaging members 14. As such, the torque distribution capabilities of driveline assembly 16 allow for different amounts of torque to be distributed between the left-side ground-engaging members 12a, 14a and the right-side ground-engaging members 12b, 14b and/or between front ground-engaging members 12a, 12b and rear ground-engaging members 14a, 14b.

By controlling torque between the left and right side ground-engaging members 12a, 14a, 12b, 14b (also referred to as torque vectoring), yaw may be controlled for increased handling and control of vehicle 10, and by controlling torque between front and rear ground-engaging members 12, 14 (also referred to as torque biasing), traction control and stability may be enhanced in both a straight line and in corners. It may be appreciated that such torque distribution promotes handling, faster turning, reduces understeer, increases stability, and limits to torque flowing into driveline assembly 16 to protect driveline components from torque spikes seen in various driving conditions or overload situations.

Additionally, the torque distribution capabilities of driveline assembly 16 may be used to affect yaw, rotation, and/or steering of vehicle 10 (e.g., to correct oversteer and understeer situations), such as that shown in FIG. 9A, where, for example, more torque may be distributed to rear, right ground-engaging member 14b to correct an oversteer condition when vehicle 10 is turning to the right or more torque may be distributed to rear, left ground-engaging member 14a to correct an understeer condition when vehicle 10 is turning to the right.

To adjust torque to each ground-engaging member 12, 14, various configurations of driveline assembly 16 may be used, as disclosed herein. With reference to the embodiments of the present disclosure, torque altering units may be used to describe any embodiment or mechanism configured for torque or speed vectoring or torque or speed biasing disclosed herein, such as clutch packs, planetary gear sets, open differentials, limited-slip differentials, locked differentials, Salisbury limited-slip differentials, positraction differentials, locked spool or axle, solid axle, or any variant or combination of the above or similar mechanisms configured to transmit or alter torque at any of ground-engaging members 12, 14. As such, the embodiments disclosed herein reference particular types of torque altering units, however, it is to be appreciated that the disclosed torque altering units may be substituted or used in combination with any other type of torque altering unit or mechanism.

In addition to altering or controlling distribution of torque at ground-engaging members 12, 14, braking may be used to affect stability, handling, yaw, etc., where braking may be used at one ground-engaging member 12, 14 while active torque vectoring or biasing is simultaneously used at another ground-engaging member 12, 14. As such, the braking system of vehicle 10 also is defined as an embodiment of the torque altering unit(s) disclosed herein. In various embodiments, the torque distribution capabilities of vehicle 10 may brake the inner ground-engaging member(s) 12 and/or 14 to send torque to the outer ground-engaging member(s) 12 and/or 14. For example, while some embodiments of the torque altering unit(s) of vehicle 10 may increase the torque at any of ground-engaging members 12 and/or 14, when the braking system of vehicle 10 is used as the torque altering unit(s) of vehicle 10, the braking system actively slows the speed of a particular ground-engaging member 12, 14, thereby causing a similar effect for vehicle 10.

Further, various embodiments of the torque altering unit(s) disclosed herein may (e.g., twin clutch packs) may be configured as a launch mechanism or launch clutch for vehicle 10. For example, clutches downstream of transmission 52 or another gearbox of vehicle 10 may be used for launching vehicle 10 during starting. In such embodiments, instead of launching at the CVT belt of transmission 52, for example, vehicle 10 can launch at the torque altering clutch pack(s).

Figure 10A:
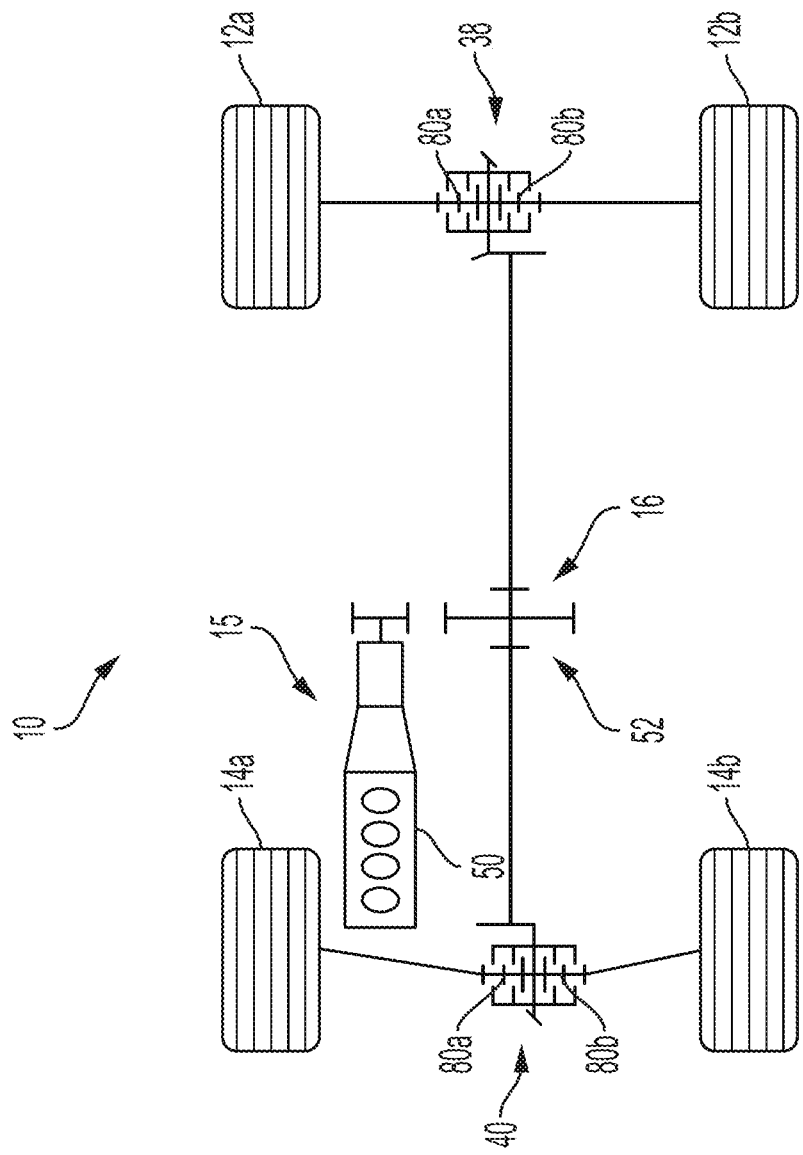
FIG. 10A is a schematic view of the driveline assembly of FIG. 8 defining front and rear differentials by twin or dual clutches.
Figure 10B:
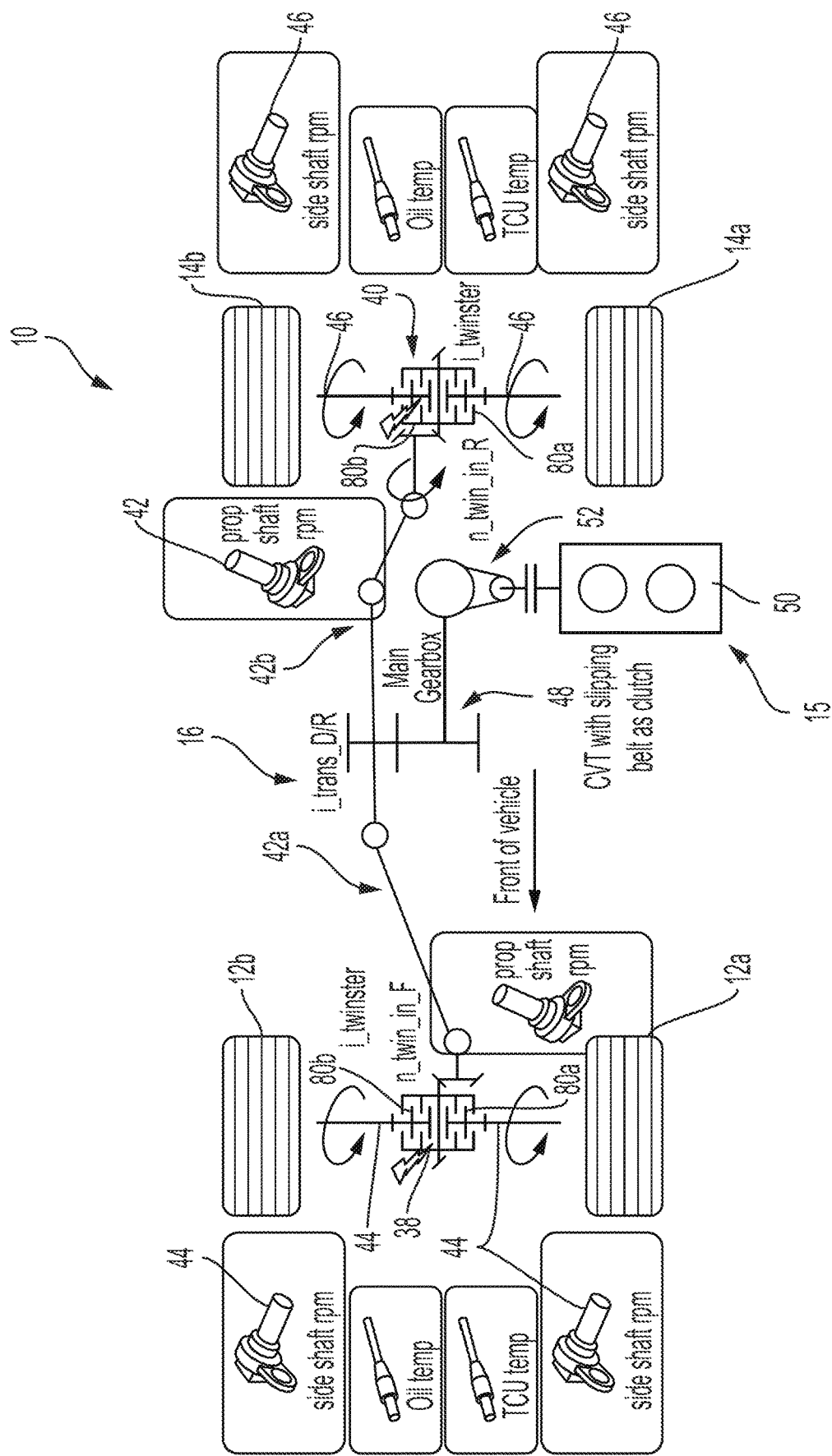
FIG. 10B is a further schematic view of the driveline assembly of FIG. 10A.
Figure 11A:
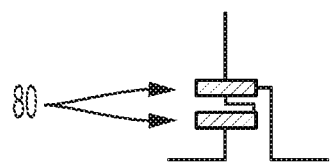
FIG. 11A is a schematic view of the twin or dual clutches of FIG. 10A configured for a bevel gear after the clutches.
Figure 11B:
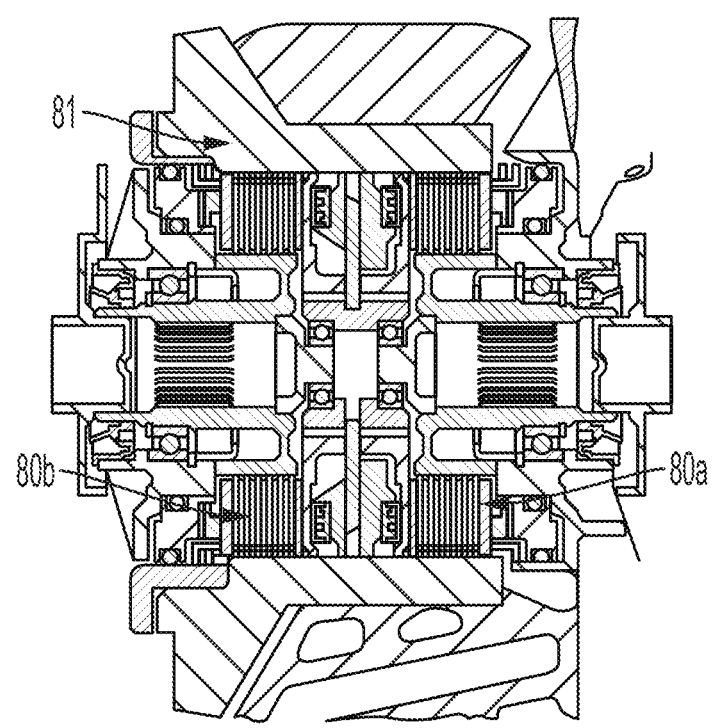
FIG. 11B is a schematic view of a ring gear configured to receive the twin or dual clutches of FIG. 10A within an inner diameter of the ring gear.

For instance, and referring to FIGS. 10A and 10B, various embodiments of the torque altering units may be an "active torque differential" or "active torque electronic differential" configured as twin or dual mechanical or electromechanical clutch packs 80 which distribute torque to each half shaft 44, 46 after a bevel gear (not shown). For example, front differential 38 may be defined by a first or left-side clutch 80a and a second or right-side clutch 80b. Similarly, rear differential 40 may be defined by clutches 80a, 80b. In order to maintain the narrow width of vehicle 10 (e.g., for trail compatibility), as shown in FIG. 11A, each clutch pack 80 may be approximately parallel (e.g., with approximately 10° of parallel in the lateral or vertical direction) with prop shaft 42 and a bevel gear may be provided after each clutch pack 80 which does not increase the width of differentials 38, 40. This configuration of a bevel gear provided after clutches 80 may limit the width of the torque altering unit to six inches or less. In other embodiments, and as shown best in FIG. 11B, the width of the torque altering unit may be limited to eight inches or less by providing a ring gear 81 sufficient to fit the clutch packs within its inner diameter. Additionally, if rear differential 40 is an active torque differential or active electronic differential, rear differential 40 may be integrated with the rear gearbox and/or a portion of transmission 52. More particularly, rear differential 40 may be integrated into a portion of the housing of the rear gearbox and/or transmission 52.

The advantage of twin clutch packs 80 is that torque may be controlled independently at each ground-engaging member 12, 14 but the width of such differential mechanism is not increased and, therefore, the width of vehicle 10 is not affected nor is the packaging/locating of other components of vehicle 10. Additionally, center differential 48 may not be used in embodiments comprising clutch packs 80 for both front and rear differentials 38, 40 because, by using two clutch packs 80, torque may be controlled both between right and left ground-engaging members 12a, 14a, 12b, 14b and between front and rear ground-engaging members 12, 14 without the need for center differential 48 to transfer torque to front and rear ground-engaging members 12, 14. Alternatively, a planetary gear set or any other type of torque altering unit may be used to control torque between the left and right ground-engaging members 12, 14.

A further advantage of twin clutch packs 80 is that such clutch packs 80 may be configured to limit driveline torque. More particularly, if a large torque spike input occurs at any of ground-engaging members 12, 14, clutch pack 80 will slip at the corresponding axle 44, 46 instead of at the driveline component. In this way, it is possible for various embodiments of the torque altering units disclosed herein (e.g., clutch pack 80) to protect upstream and downstream components by limiting the maximum torque within that system.

As shown best in FIGS. 8-12, torque distribution for vehicle 10 may be controlled through a control system 60. Control system 60 includes a torque control unit 62 which may receive inputs from multiple systems or components of vehicle 10. For example, control unit 62 may receive inputs from at least a steering angle sensor 64, a yaw sensor 66, a wheel speed sensor 68, an accelerometer 70, a gyroscope 72, an accelerator pedal position sensor, a brake pedal position sensor, a transmission control unit ("TCU"), and/or an engine control unit ("ECU"). Wheel speed sensor 68 may be positioned at each of ground-engaging members 12, 14 or at only some of ground-engaging members 12, 14. Based on input received from at least sensors 64, 66, 68, control unit 62 may output torque commands to at least one of front differential 38, rear differential 40, and/or center differential 48. Additionally, control unit 62 may receive input from any of front differential 38, rear differential 40, and/or center differential 48.

Various inputs may be taken into account when controlling torque to each ground-engaging member 12, 14 using dual or twin clutches 80a, 80b. For example, at least the speed (rpm) of front half shafts 44, the speed (rpm) of rear half shafts 46, the oil temp of engine 50, the temperature of the TCU, the speed (rpm) of engine 50, the accelerator pedal location, the status of engine 50/throttle (e.g., status of an engine controller), the status of transmission 52 (e.g., status of the TCU), the steering angle, the speed (rpm) of prop shaft 42 (front and rear 42a, 42b, in various embodiments), pitch angle, detection of a potential pitch-over or roll condition, lateral acceleration, vehicle speed, and terrain conditions may be taken into account when determining the distribution of torque to each ground-engaging member 12, 14. In at least the embodiments where front and/or rear differentials 38, 40 are defined by clutch packs 80, clutch packs 80 allow for slip, so the torque distribution capabilities of vehicle 10 are not merely on or off (e.g., locked or unlocked), but instead, allow for variations in torque at any of ground-engaging members 12, 14.

Figure 2:
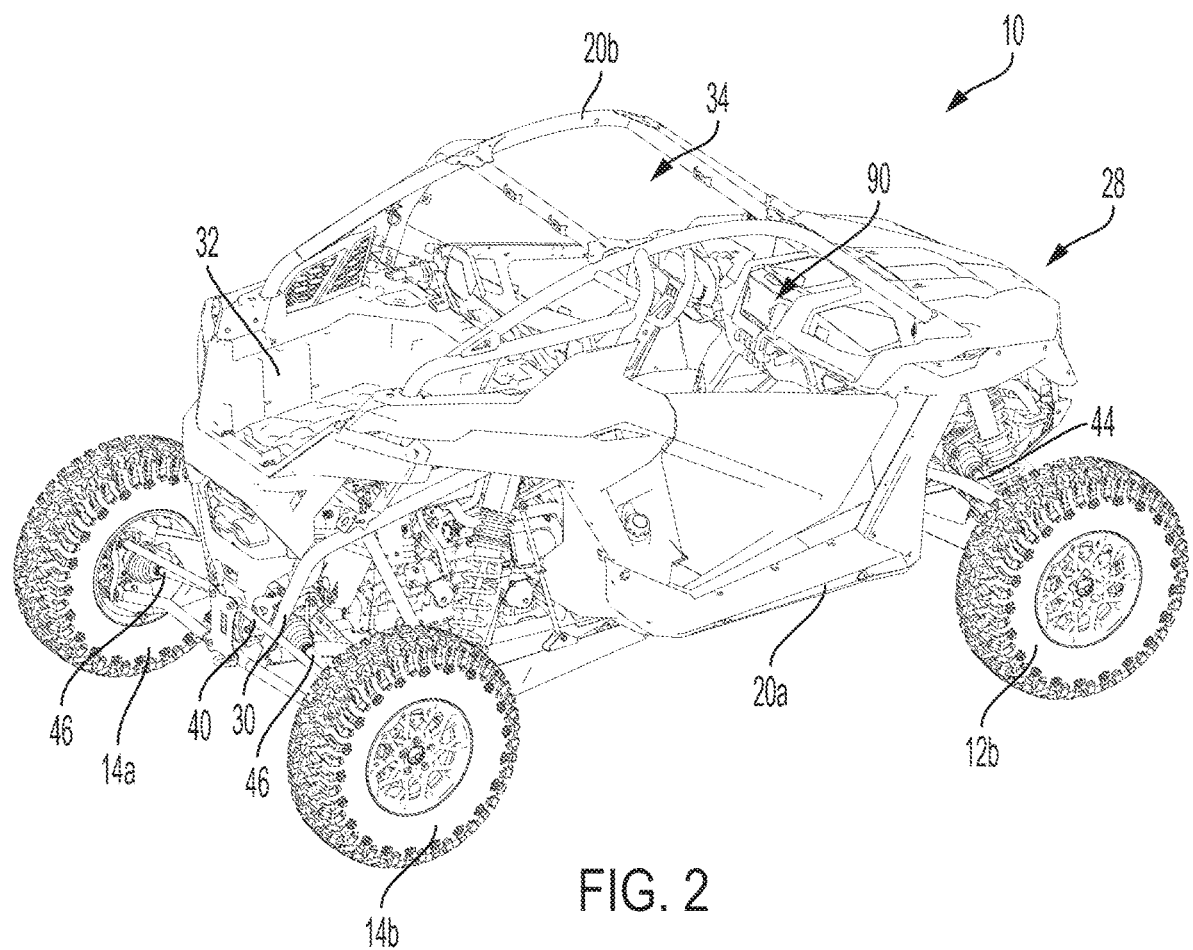
FIG. 2 is a rear right perspective view of the utility vehicle of FIG. 1.

Control unit 62 also may be in communication with a gauge or display 90 within operator area 34 (FIG. 2) to provide torque information to the operator and/or to receive operating mode inputs (e.g., terrain inputs, predetermined operating mode selections, 2WD or 4WD mode selection, etc.) and/or torque input commands in embodiments allowing the operator to adjust torque to any of ground-engaging members 12, 14. In certain embodiments, control unit 62 may be in communication with other components or systems of vehicle 10 such other components or systems may be adjusted along with torque altering parameters. For instance, depending on a vehicle mode selected, suspension parameters, steering parameters, powertrain parameters, and/or torque output parameters may be automatically adjusted. Additional information about suspension control and other details of vehicle 10 may be disclosed in U.S. patent application Ser. No. 16/198,280, filed on Nov. 21, 2018, and entitled "VEHICLE HAVING ADJUSTABLE COMPRESSION AND REBOUND DAMPING", the complete disclosure of which is expressly incorporated by reference herein.

Figure 13:
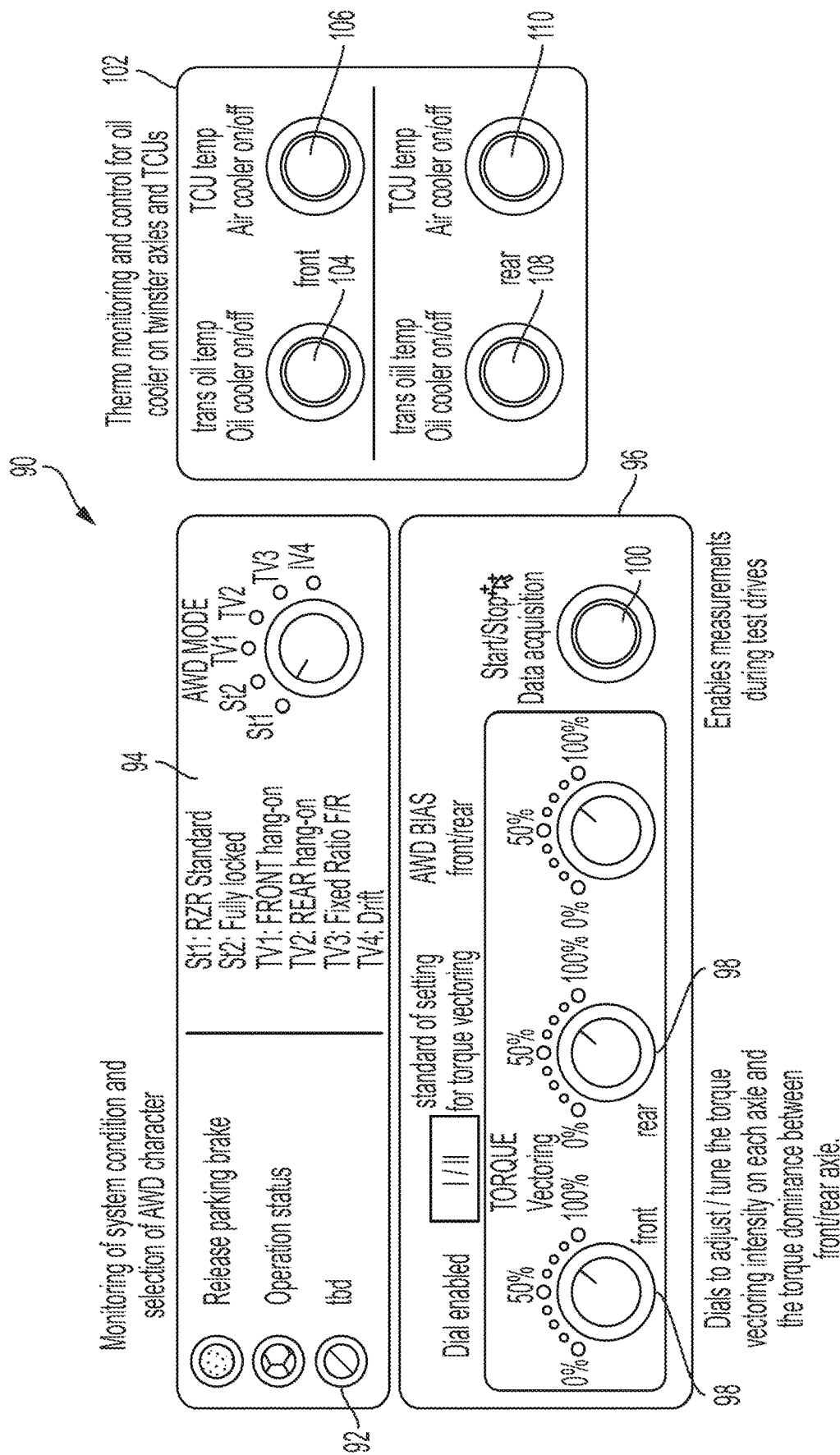
FIG. 13 is an instrument cluster or gauge display for controlling torque vectoring for the vehicle of FIG. 1.
Figure 14:
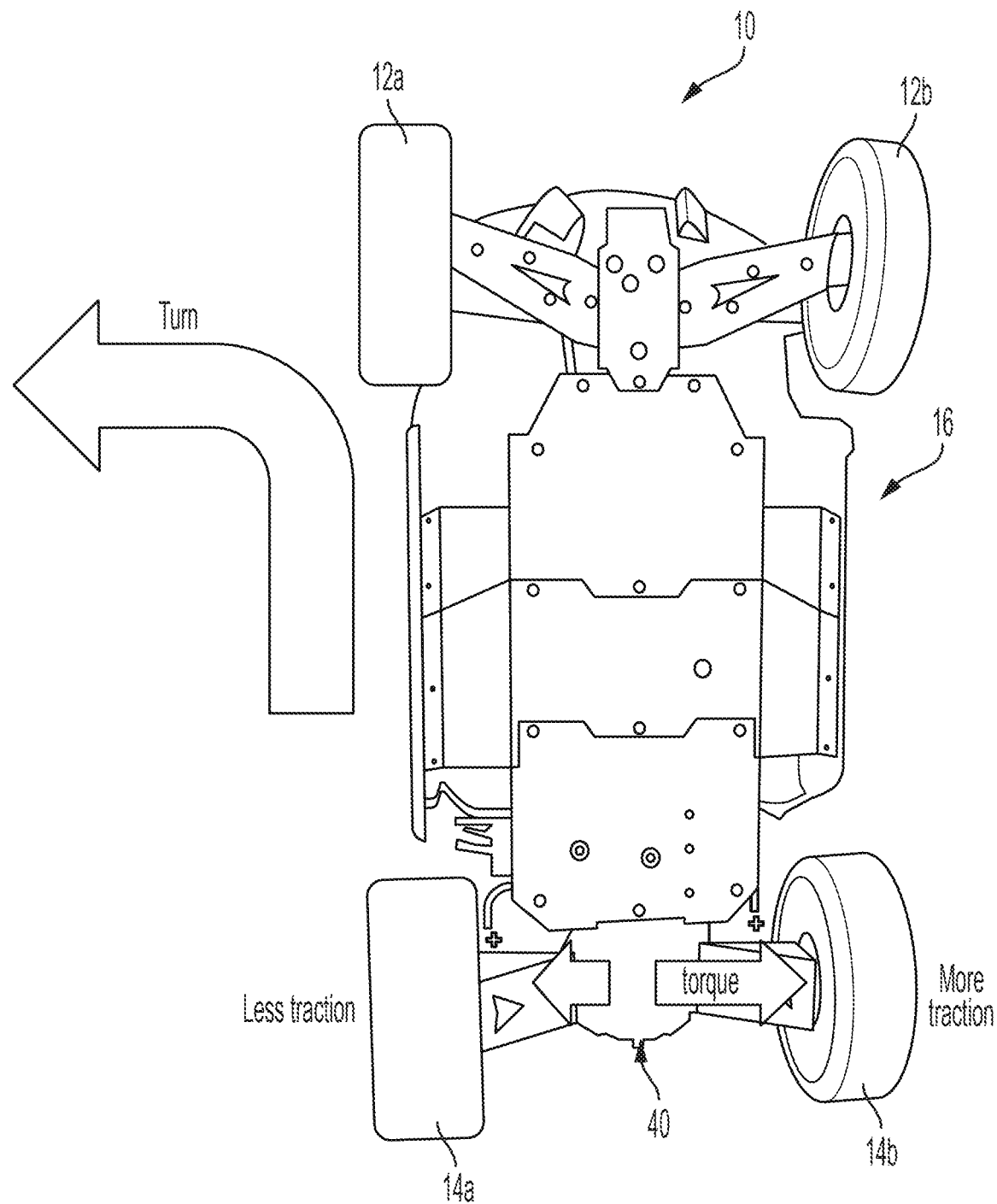
FIG. 14 is a bottom view of the vehicle of FIG. 1 where torque vectoring is being used for making a left turn when in a two-wheel drive operating mode.
Figure 15:
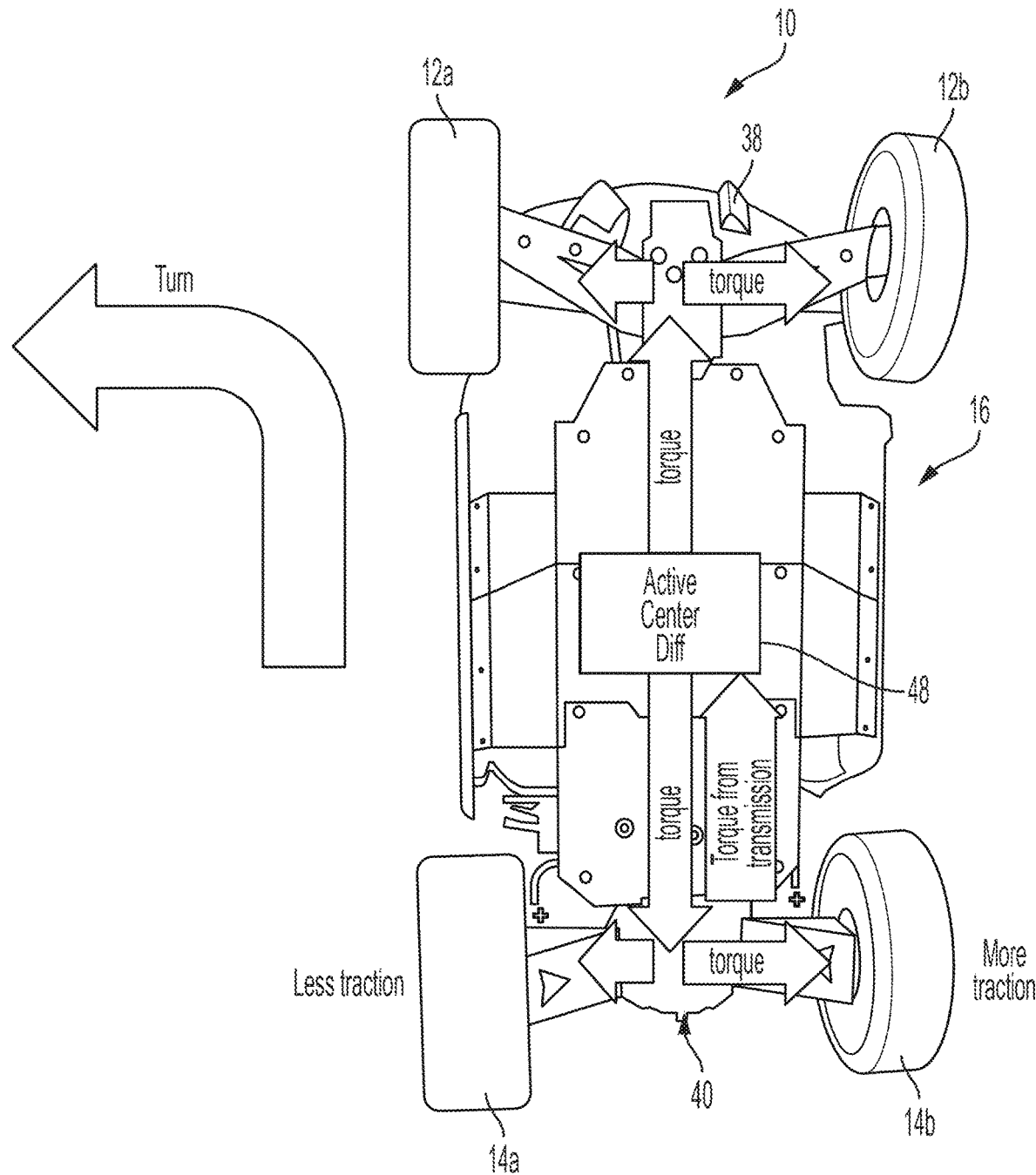
FIG. 15 is a bottom view of the vehicle of FIG. 1 where torque vectoring is being used for making a left turn when in an all-wheel/four-wheel drive operating mode.

As shown in FIG. 13, gauge or display 90 may include an instrument cluster, an instrumental panel, or an input menu for a touchscreen display, which includes a first section 92 for displaying and/or selecting the status of the parking brake and the operation status of vehicle 10. Additionally, display 90 may include a second section 94 for selecting the drive or operating mode of driveline assembly 16 (e.g., standard mode, fully-locked mode, front hang-on (i.e., primarily front-wheel drive) mode, rear hang-on (i.e., primarily rear-wheel drive) mode, fixed-ratio front and rear mode, and drift mode. It may be appreciated that, in the hang-on modes, zero torque may be provided to a particular axle 44, 46 until slip occurs at the opposite axle 44, 46. For example, zero torque may be provided at front axle 44 until slip occurs at rear axle 46.

Display 90 includes a third section 96 which includes inputs 98 for torque vectoring between each axle and torque bias/dominance between front and rear ground-engaging members 12, 14. Third portion 96 also includes an input 100 for engaging and/or disengaging data acquisition during test drives. Display 90 further includes a fourth section 102 having an input 104 for engaging and/or disengaging the front oil cooler for transmission 52, an input 106 for engaging and/or disengaging the front air cooler for the TCU, an input 108 for engaging and/or disengaging the rear oil cooler for transmission 52, and an input 106 for engaging and/or disengaging the rear air cooler for the TCU. In various embodiments, any number of oil coolers may be provided and the coolers are not limited to front and/or rear oil coolers. More particularly, the torque altering unit(s) disclosed herein may have supplemental coolers to increase performance and longevity of the unit(s). Alternatively, other cooling mechanism may be provided in addition to or in place of an oil cooler, such as cooling fins for convection cooling of the unit(s). In this way, the operator may be able to selectively choose how vehicle 10 and driveline assembly 16 should be operated, however, control system 60 (FIG. 12) also can automatically engage or disengage the torque distribution capabilities of driveline assembly 16 depending on various operating conditions. Alternatively, display 90 may have less than the four sections 92, 94, 96, 102 to limit operator options for adjusting torque.

In operation, and referring to FIGS. 9 and 10A, control system 60 is in communication with at least driveline assembly 16 and is configured to provide independent torque distribution, under various operating conditions or at the discretion of the operator, by varying the torque output at each of ground-engaging members 12, 14. For example, as shown in FIG. 9, if vehicle 10 is to make a left turn and is operating in a 2WD mode, control system 60 monitors inputs from sensors 64, 66, 68 to determine how much force to apply to left and right clutches 80 of rear differential 40 to distribute the necessary torque for maximum traction and turning. Illustratively, control system 60 may apply more force to the outer clutch 80b of rear differential 40 to give more traction at ground-engaging member 14b.

Additionally, as shown in FIG. 10A, if vehicle 10 is to make a left turn and is operating in a 4WD or AWD mode, control system 60 monitors inputs from sensors 64, 66, 68 to determine how much force to apply to left and right clutches 80a, 80b of front differential 38 and rear differential 40 to distribute the necessary torque for maximum traction and turning. Illustratively, control system 60 may apply more force to outer clutch 80b of rear differential 40 to give more traction at ground-engaging member 14b.

The following illustrative embodiments disclose various configurations of driveline assembly 16 configured with independent torque distribution capabilities. For example, and as disclosed herein, various embodiments of driveline assembly 16 are configured for operating in the two-wheel drive mode, where torque distribution may be accomplished with an active torque differential having electromagnetic clutch packs 80 or through active individual braking with an open differential. Additionally, and as disclosed further herein, in embodiments of driveline assembly 16 configured for all-wheel drive mode, torque distribution may be accomplished with active center differential 48 and active front and rear differentials 38, 40, active center differential 48 and open front and rear differentials 38, 40 with active braking, or with active center differential 48 with front differential 38 as an active or open differential, rear differential 40 as an active or open differential, and active braking. It may be appreciated that center differential 48 is provided within driveline assembly 16 when vehicle 10 is configured for 4WD or AWD.

As is known in the art, open or unlocked differentials allow each ground-engaging member 12, 14 to rotate independently at different speeds. Selective locking differentials allow for selective locking together of both ground-engaging members on a particular axle on an axle so that those ground-engaging, members rotate at the same speed as each other. Active differentials are electronically controlled and used to control the speed of any of ground-engaging members 12, 14 based on various vehicle, terrain, or operating parameters.

Rear-Mounted Powertrain Assembly—Longitudinally-Extending Engine

Figure 5:
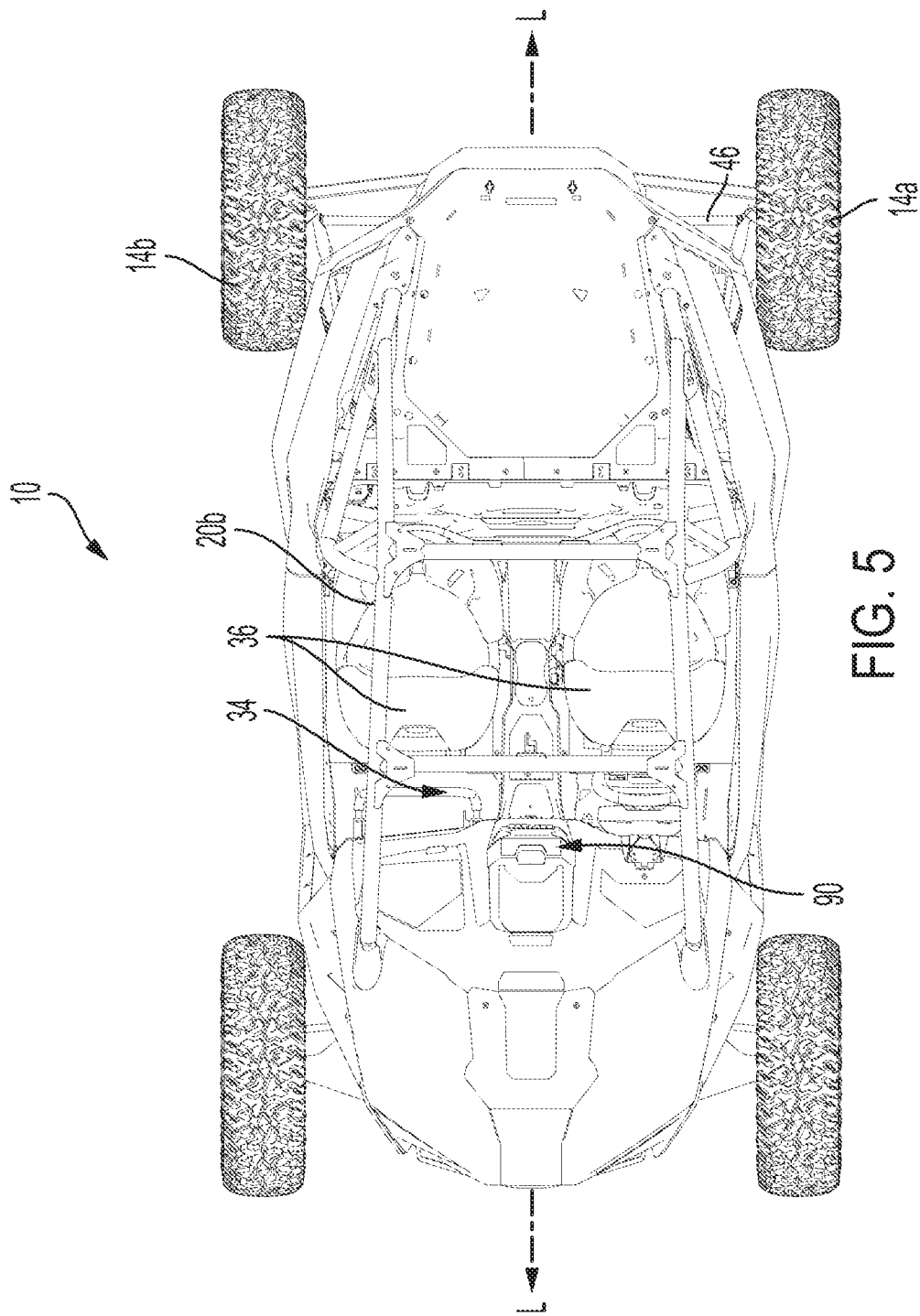
FIG. 5 is a top view of the utility vehicle of FIG. 1.
Figure 6:
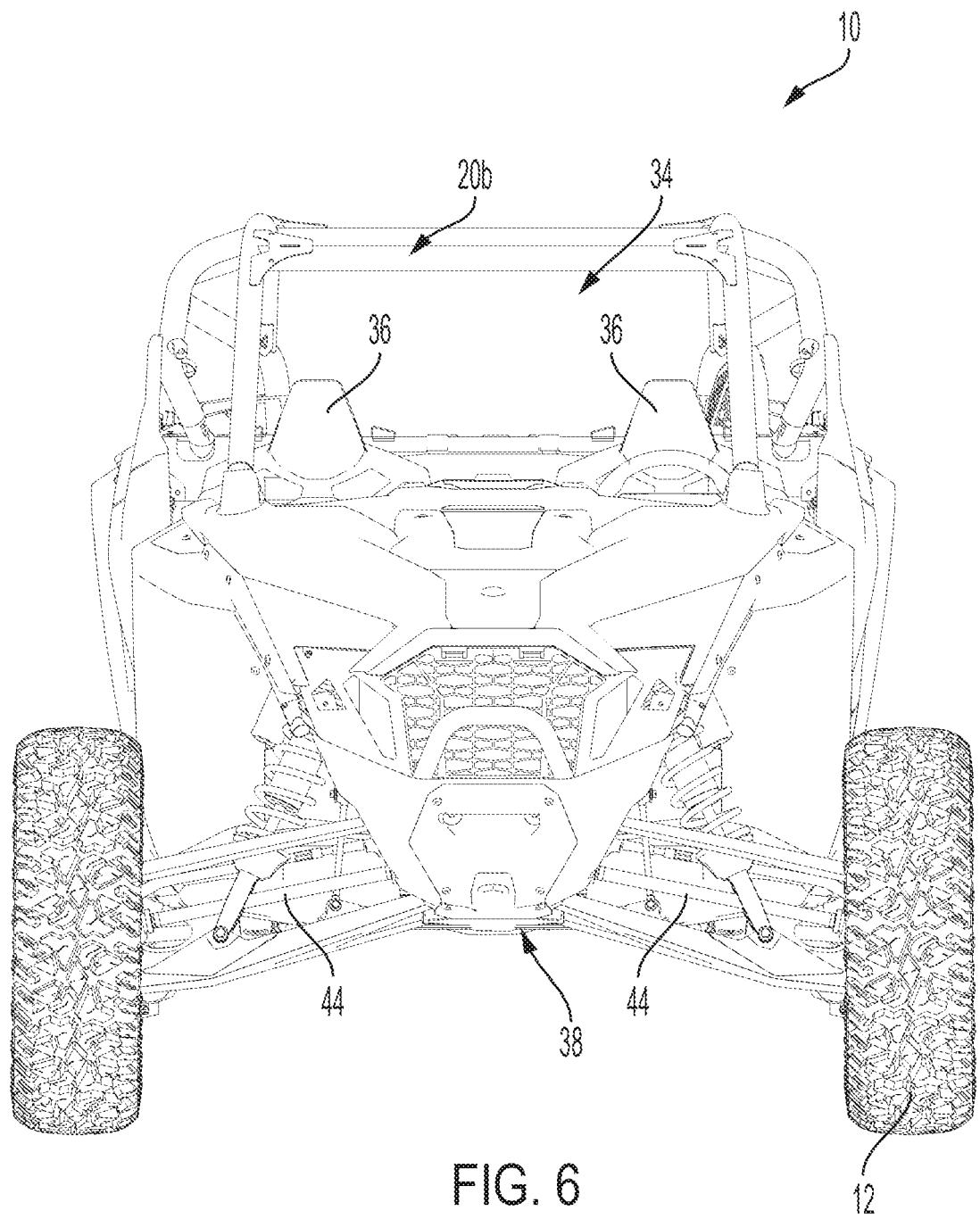
FIG. 6 is a front view of the utility vehicle of FIG. 1.
Figure 7:
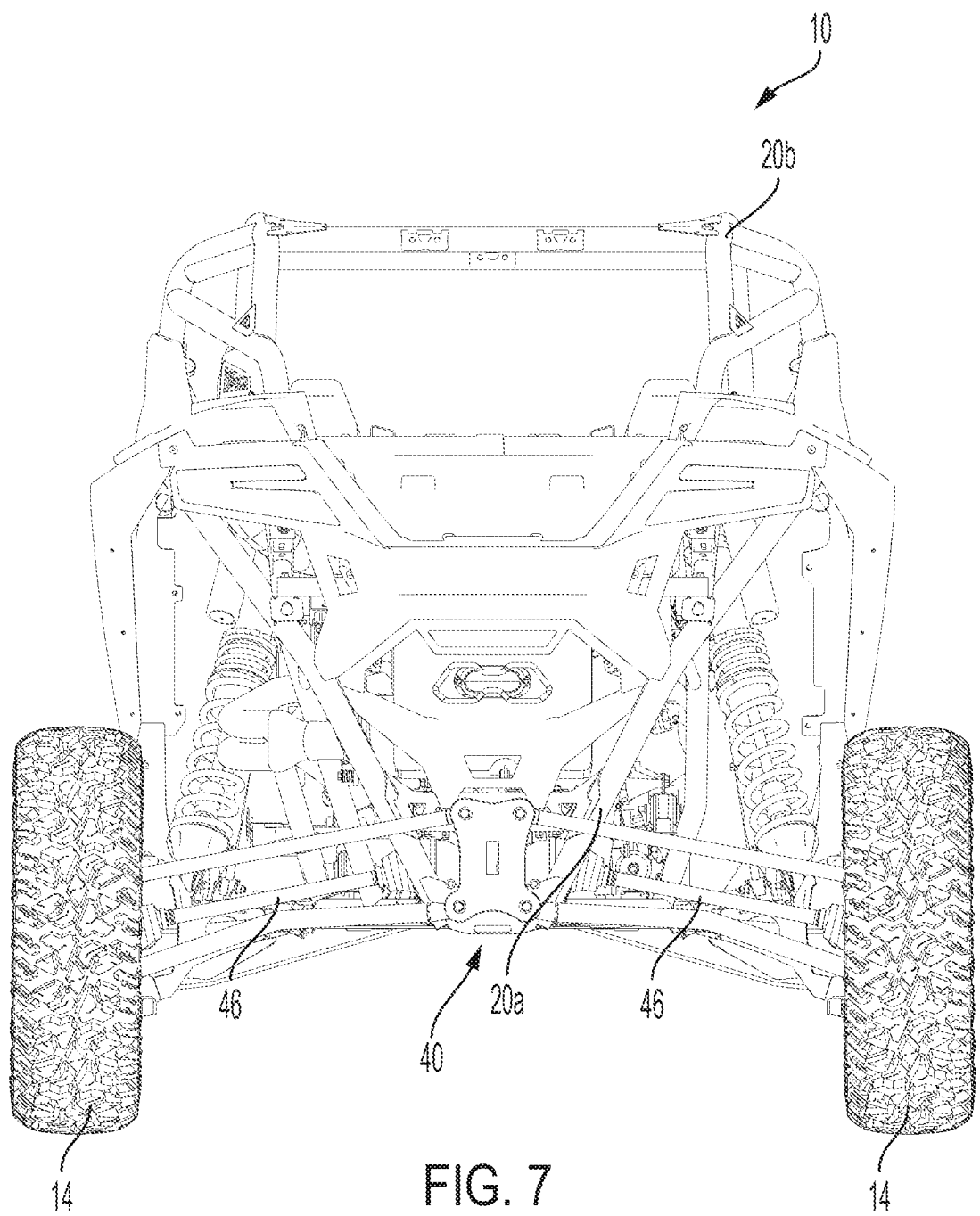
FIG. 7 is a rear view of the utility vehicle of FIG. 1.

Referring to FIGS. 16A-19C, powertrain assembly 15 includes engine 50 having a longitudinally-extending configuration and operably coupled to at least transmission 52 for providing power to any of ground-engaging members 12, 14. Engine 50 extends longitudinally such that a crankshaft (not shown) of engine 50 is generally or approximately parallel to longitudinal axis L (FIG. 5). In particular, the orientation of the crankshaft has a directional component greater in the longitudinal direction rather than the lateral direction (the lateral direction is perpendicular to longitudinal axis L).

Figure 16B:
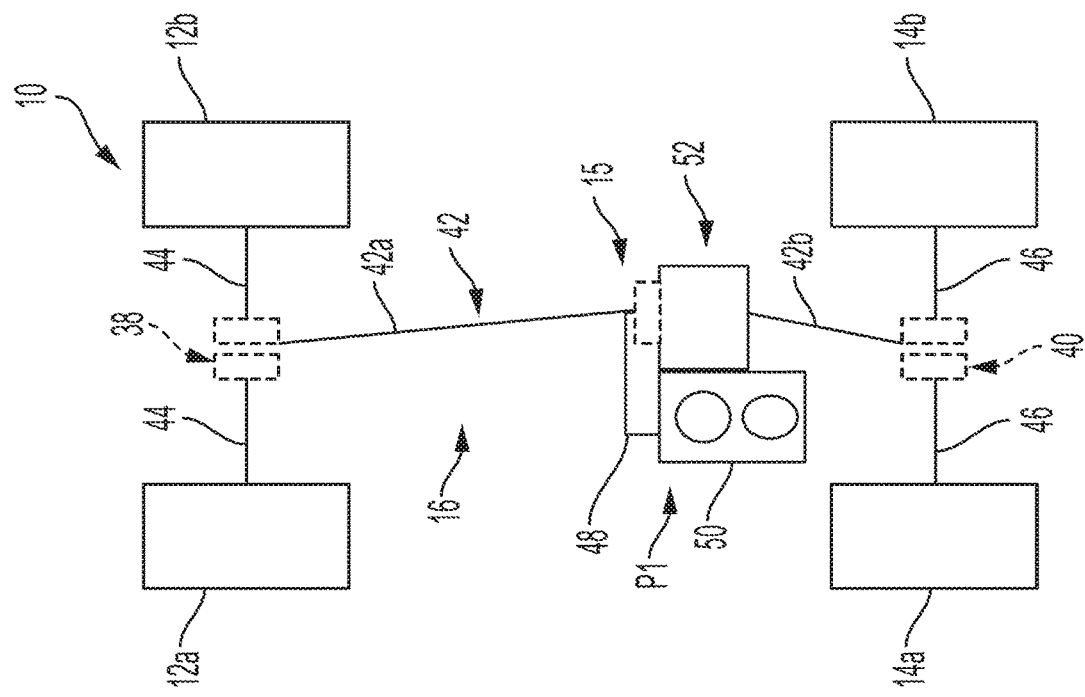
FIG. 16B is a schematic view of the powertrain assembly of FIG. 8 having the longitudinally-extending engine and the driveline assembly of FIG. 8 having front and rear active torque differentials and a center differential.
Figure 16A:
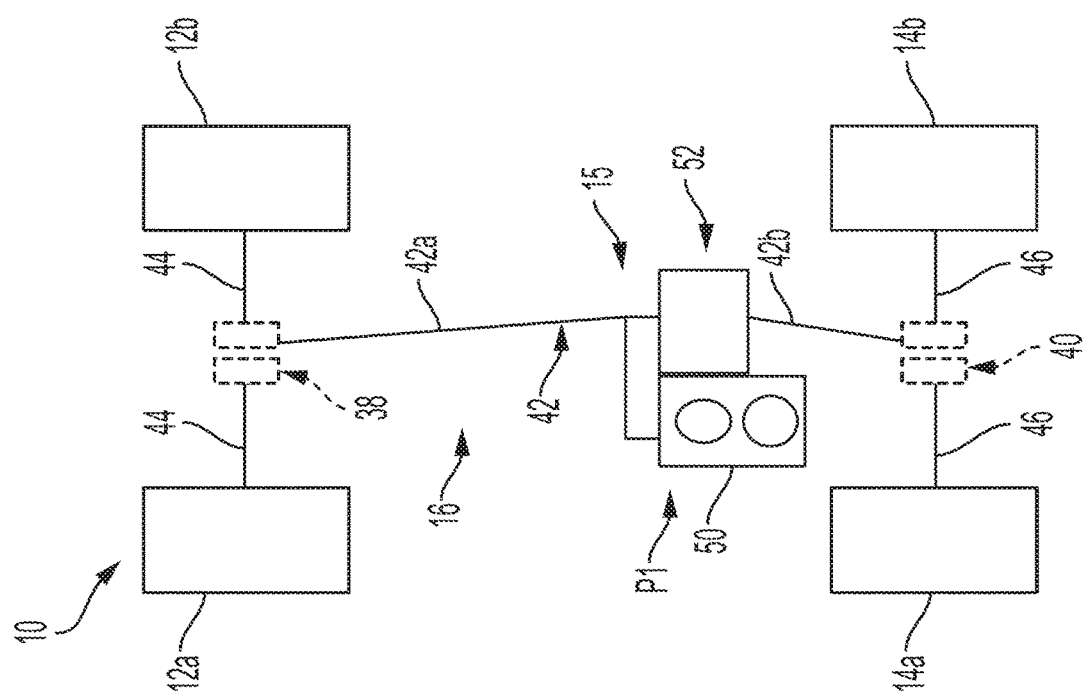
FIG. 16A is a schematic view of the powertrain assembly of FIG. 8 having a longitudinally-extending engine and the driveline assembly of FIG. 8 having front and rear active torque differentials.

With respect to FIGS. 16A and 16B, powertrain assembly 15 is positioned at approximately first position P1 (FIG. 8). Engine 50 extends longitudinally and front and rear prop shafts 42a, 42b are operably coupled to transmission 52. With respect to the illustrative embodiment of FIG. 16A, front differential 38 of driveline assembly 16 defines an active torque differential and rear differential 40 of driveline assembly 16 also defines an active torque differential. Front active torque differential 38 is operably coupled to transmission 52 through front prop shaft 42a and to front ground-engaging members 12 through half shafts 44. Rear active torque differential 40 is operably coupled to transmission 52 through rear prop shaft 42b and to rear ground-engaging members 14 through half shafts 46.

In the embodiment of FIG. 16A, driveline assembly 16 does not include center differential 48 because driveline assembly 16 may not be configured for AWD/4WD. However, in the embodiment FIG. 16B, driveline assembly 16 does include center differential 48 and is configured for AWD/4WD. Center differential 48 is positioned at approximately first position P1 (FIG. 8) and is operably coupled to or integrated with transmission 52.

The configuration of driveline assembly 16, as shown in FIGS. 16A and 16B, is generally comprised of mechanical components and allows torque to be controlled independently at each ground-engaging member 12, 14. For example, varying and different amounts of torque can be provided simultaneously to each front-ground engaging member 12 and to each rear ground-engaging member 14. In this way, the torque at each ground-engaging member 12a, 12b, 14a, 14b may be different and independently controlled even as each ground-engaging member 12a, 12b, 14a, 14b receives a simultaneous torque input from control system 60. Additionally, when necessary, torque may be constant and identical at each ground-engaging member 12, 14.

Figure 17B:
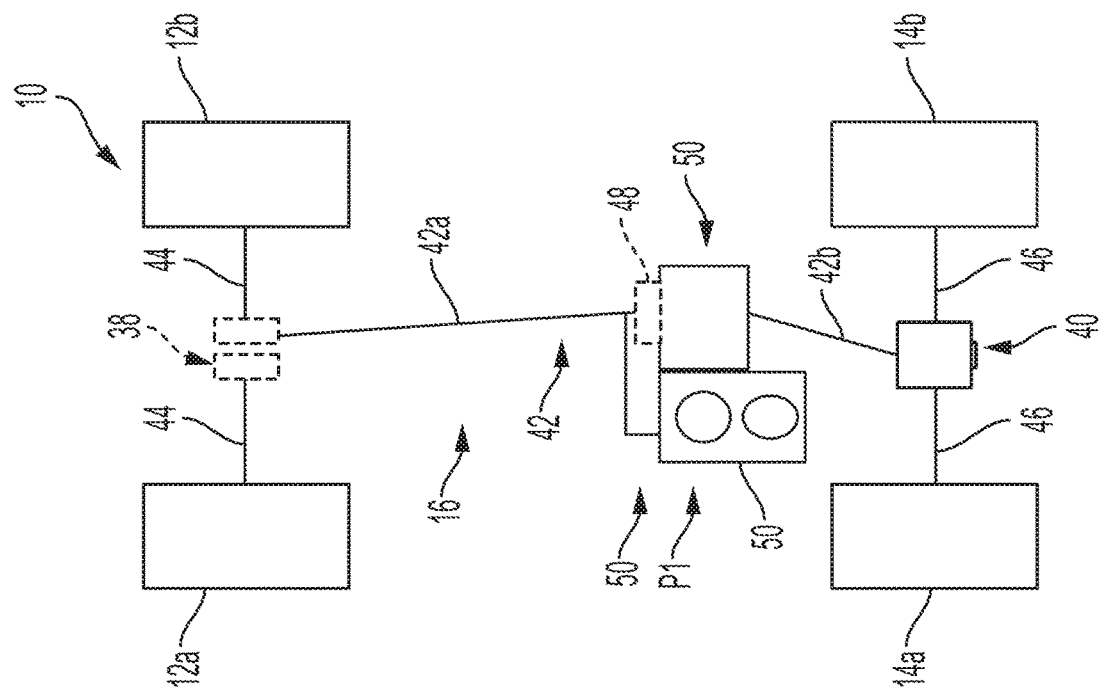
FIG. 17B is a schematic view of the powertrain assembly of FIG. 8 having the longitudinally-extending engine and the driveline assembly of FIG. 8 having the front active torque differential, the rear open or selectable locking differential, and the center differential.
Figure 17A:
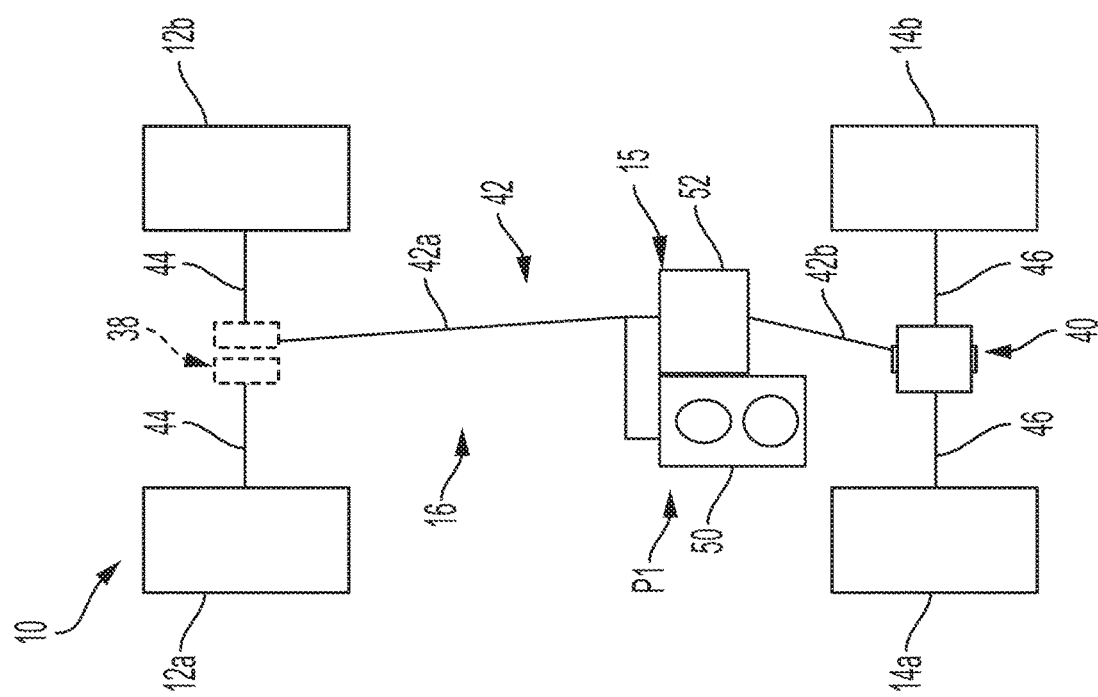
FIG. 17A is a schematic view of the powertrain assembly of FIG. 8 having the longitudinally-extending engine and the driveline assembly of FIG. 8 having the front active torque differential and a rear open or selectable locking differential.

With respect to FIGS. 17A and 17B, powertrain assembly 15 is positioned at approximately first position P1 (FIG. 8). Engine 50 extends longitudinally and front and rear prop shafts 42a, 42b are operably coupled to transmission 52. With respect to the illustrative embodiment of FIG. 17A, front differential 38 of driveline assembly 16 defines an active torque differential and rear differential 40 of driveline assembly 16 defines an open or selectable locking differential. Front active torque differential 38 is operably coupled to transmission 52 through front prop shaft 42a and to front ground-engaging members 12 through half shafts 44. Rear open or selectable locking differential 40 is operably coupled to transmission 52 through rear prop shaft 42b and to rear ground-engaging members 14 through half shafts 46.

In the embodiment of FIG. 17A, driveline assembly 16 does not include center differential 48 and, therefore, may not be configured for AWD/4WD. However, in the embodiment FIG. 17B, driveline assembly 16 does include center differential 48 and, as such, may be configured for AWD/4WD. Center differential 48 is positioned at approximately first position P1 (FIG. 8) and is operably coupled to or integrated with transmission 52.

The configuration of driveline assembly 16, as shown in FIGS. 17A and 17B, is generally comprised of mechanical components and allows torque to be controlled independently at each front ground-engaging member 12 but may maintain the same torque at both rear ground-engaging members 14. In this way, the torque at each front ground-engaging member 12a, 12b may be different from each other and different from the torque at rear ground-engaging members 14, or, when necessary, torque may be constant/identical at all ground-engaging members 12, 14.

Figure 18B:
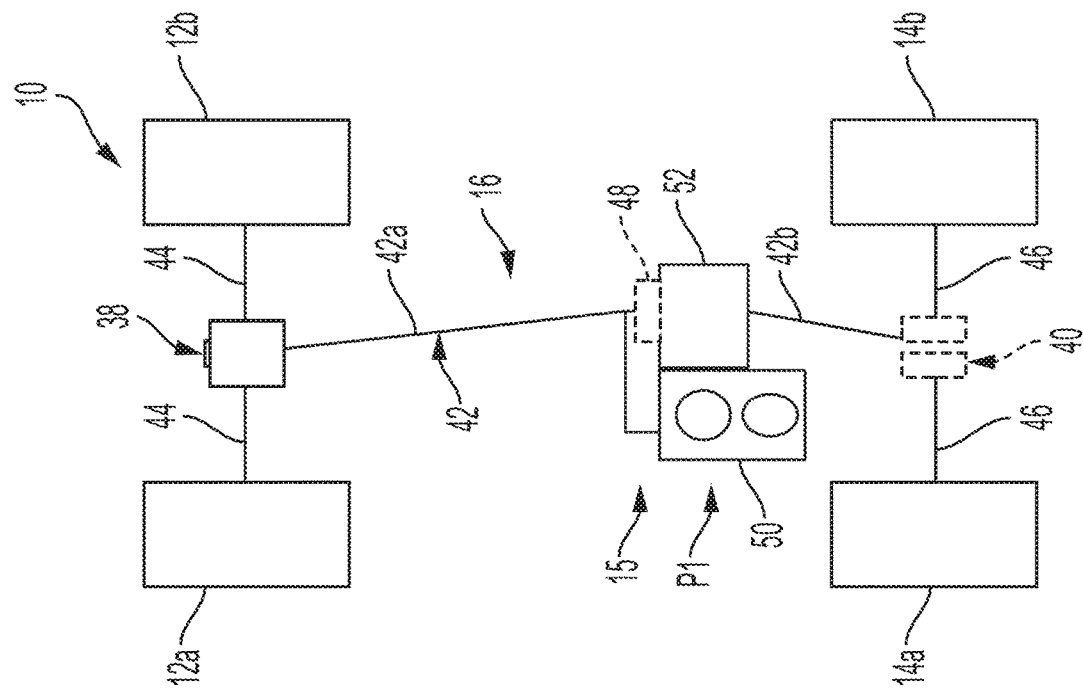
FIG. 18B is a schematic view of the powertrain assembly of FIG. 8 having the longitudinally-extending engine and the driveline assembly of FIG. 8 having the front open or selectable locking differential, the rear active torque differential, and the center differential.
Figure 18A:
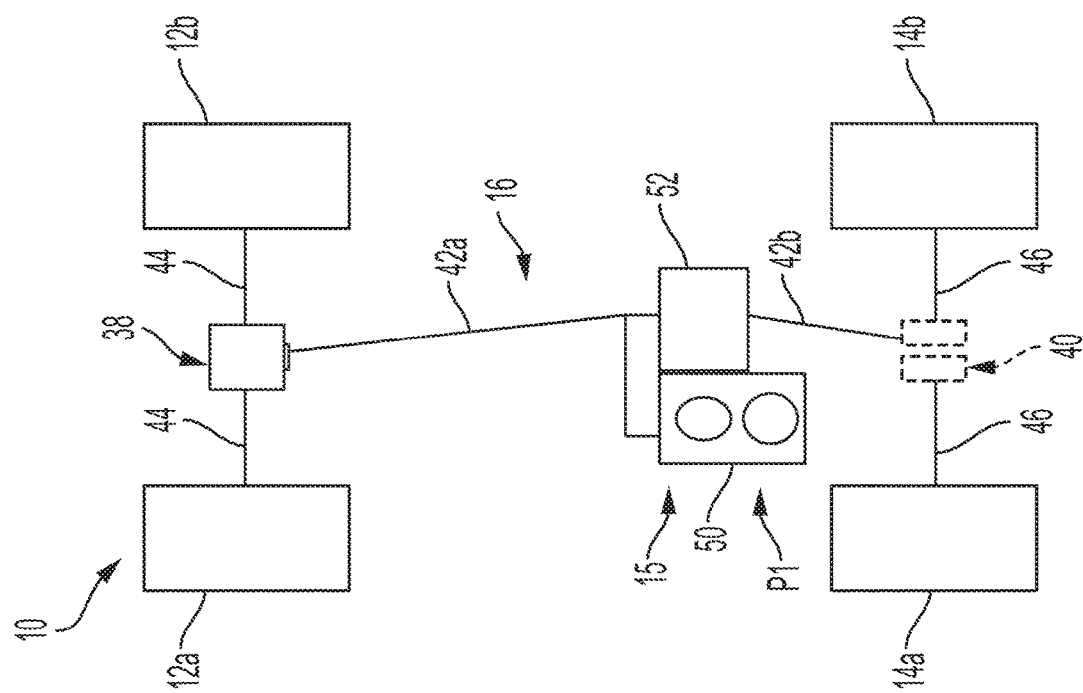
FIG. 18A is a schematic view of the powertrain assembly of FIG. 8 having the longitudinally-extending engine and the driveline assembly of FIG. 8 having a front open or selectable locking differential and the rear active torque differential.

With respect to FIGS. 18A and 18B, powertrain assembly 15 is positioned at approximately first position P1 (FIG. 8). Engine 50 extends longitudinally and front and rear prop shafts 42a, 42b are operably coupled to transmission 52. With respect to the illustrative embodiment of FIG. 18A, front differential 38 of driveline assembly 16 defines an open or selectable locking differential and rear differential 40 of driveline assembly 16 defines an active torque differential. Front open or selectable locking differential 38 is operably coupled to transmission 52 through front prop shaft 42a and to front ground-engaging members 12 through half shafts 44. Rear active torque differential 40 is operably coupled to transmission 52 through rear prop shaft 42b and to rear ground-engaging members 14 through half shafts 46.

In the embodiment of FIG. 18A, driveline assembly 16 does not include center differential 48 and, therefore, may not be configured for AWD/4WD. However, in the embodiment FIG. 18B, driveline assembly 16 does include center differential 48 and, as such, is configured for AWD/4WD. Center differential 48 is positioned at approximately first position P1 (FIG. 8) and is operably coupled to or integrated with transmission 52.

The configuration of driveline assembly 16, as shown in FIGS. 18A and 18B, is generally comprised of mechanical components and allows torque to be controlled independently at each rear ground-engaging member 14 but may maintain the same torque at both front ground-engaging members 12. In this way, the torque at each rear ground-engaging member 14a, 14b may be different from each other and different from the torque at front ground-engaging members 12, or, when necessary, torque may be constant/identical at all ground-engaging members 12, 14.

Figure 19C:
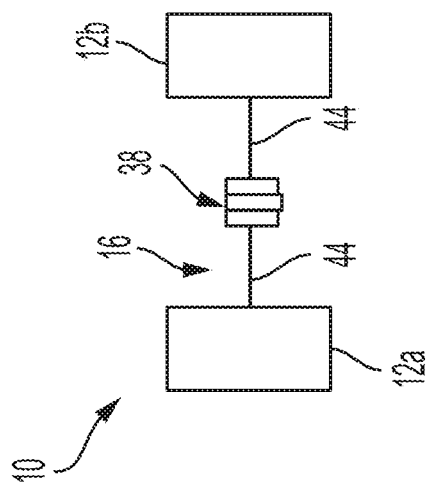
FIG. 19C is a schematic view of the powertrain assembly of FIG. 8 having the longitudinally-extending engine and the driveline assembly of FIG. 8 having the front active torque electronic differential and the rear open or selectable locking differential.
Figure 19C:
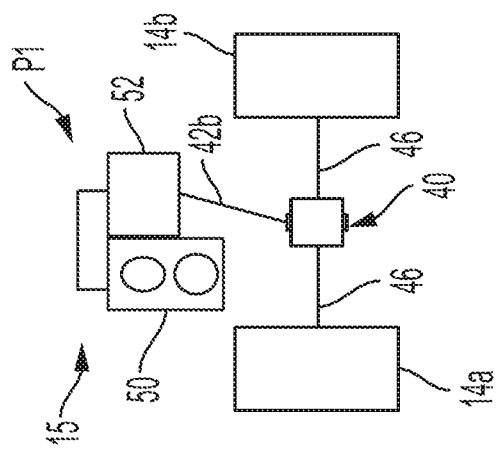
Figure 19B:
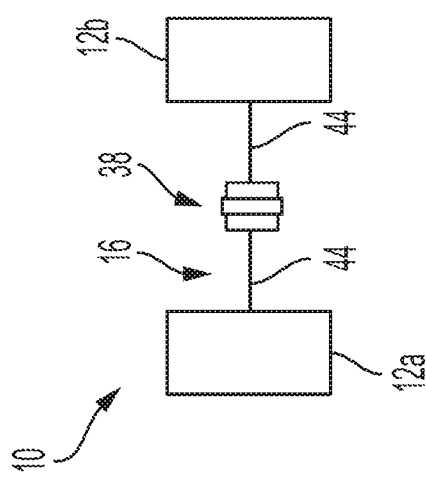
FIG. 19B is a schematic view of the powertrain assembly of FIG. 8 having the longitudinally-extending engine and the driveline assembly of FIG. 8 having a front vectoring electronic differential and the rear active torque differential.
Figure 19B:
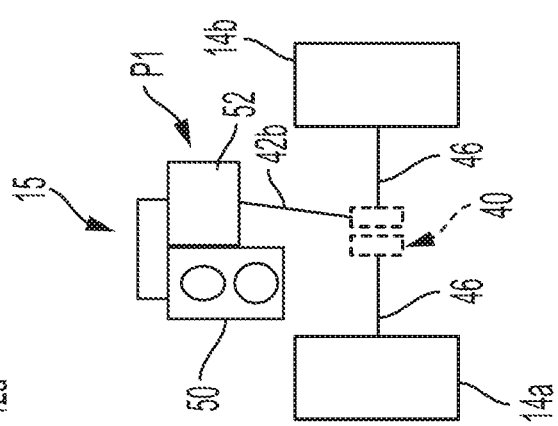
Figure 19A:
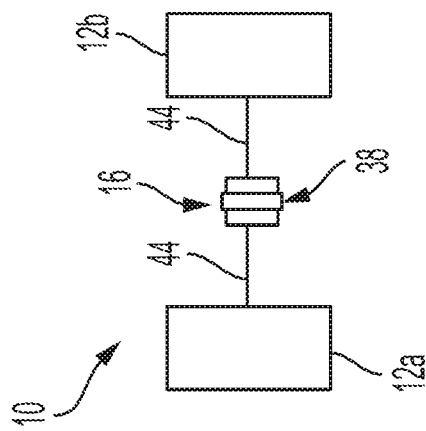
FIG. 19A is a schematic view of the powertrain assembly of FIG. 8 having the longitudinally-extending engine and the driveline assembly of FIG. 8 having front and rear active torque electronic differentials.
Figure 19A:
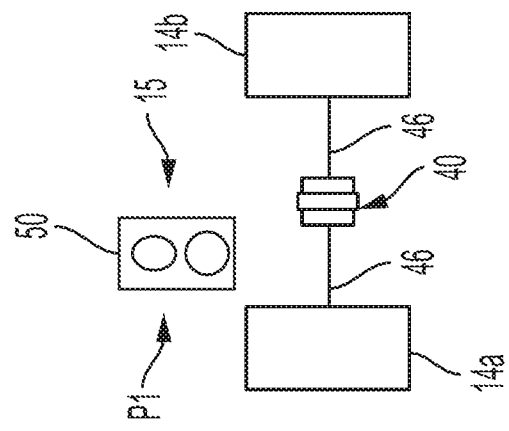

With respect to FIGS. 19A-19C, at least engine 50 of powertrain assembly 15 may be located at position P1. Front differential 38 of driveline assembly 16 defines an active torque electronic differential and rear differential 40 of driveline assembly 16 defines an active torque electronic differential. In this embodiment, prop shaft 42 may be eliminated from driveline assembly 16 and transmission 52 may be eliminated from powertrain assembly 15. In this way, torque is provided to front and rear ground-engaging members 12, 14 through electronic actuation and control of front and rear active torque electronic differentials 38, 40. The torque provided at each ground-engaging member 12, 14 may be different from each other even when simultaneously provided to any or all of ground-engaging members 12, 14, or, when necessary, may be constant/identical at all ground-engaging members 12, 14.

In the embodiment of FIG. 19B, front differential 38 defines a vectoring electronic differential while rear differential 40 defines an active torque differential. In this embodiment, front prop shaft 42a is eliminated from driveline assembly 16, however, rear prop shaft 42b operably couples powertrain assembly 15 (e.g., transmission 52) to rear differential 40. Powertrain assembly 15 may be located at position P2 (FIG. 8) and engine 50 extends longitudinally. In this way, the torque to front ground-engaging members 12 is electronically controlled and may be independent of each other. Additionally, the torque at rear ground-engaging members 14 also may be independent of each other and independent of the torque at either or both of front ground-engaging members 12. When necessary, the torque at each ground-engaging member 12, 14 may be constant/identical.

In the embodiment of FIG. 19C, front differential 38 defines an active torque electronic differential while rear differential 40 defines an open or selectable locking differential. In this embodiment, front prop shaft 42a is eliminated from driveline assembly 16, however, rear prop shaft 42b operably coupled powertrain assembly 15 (e.g., transmission 52) to rear differential 40. Powertrain assembly 15 may be located at position P2 (FIG. 8) and engine 50 extends longitudinally. In this way, the torque to front ground-engaging members 12 is electronically controlled and may be independent of each other. Additionally, the torque at rear ground-engaging members 14 also may be independent of each other and independent of the torque at either or both of front ground-engaging members 12. However, when necessary, the torque at all ground-engaging members 12, 14 may be constant/identical.

Rear-Mounted Powertrain Assembly—Laterally-Extending Engine

Referring to FIGS. 20A-23C, engine 50 defines a laterally-extending engine operably coupled to at least transmission 52 for providing power to any of ground-engaging members 12, 14. Engine 50 extends laterally such that the crankshaft (not shown) of engine 50 is generally or approximately perpendicular to longitudinal axis L (FIG. 5). In particular, the orientation of the crankshaft has a directional component greater in the lateral direction rather than the longitudinal direction.

Figure 20A:
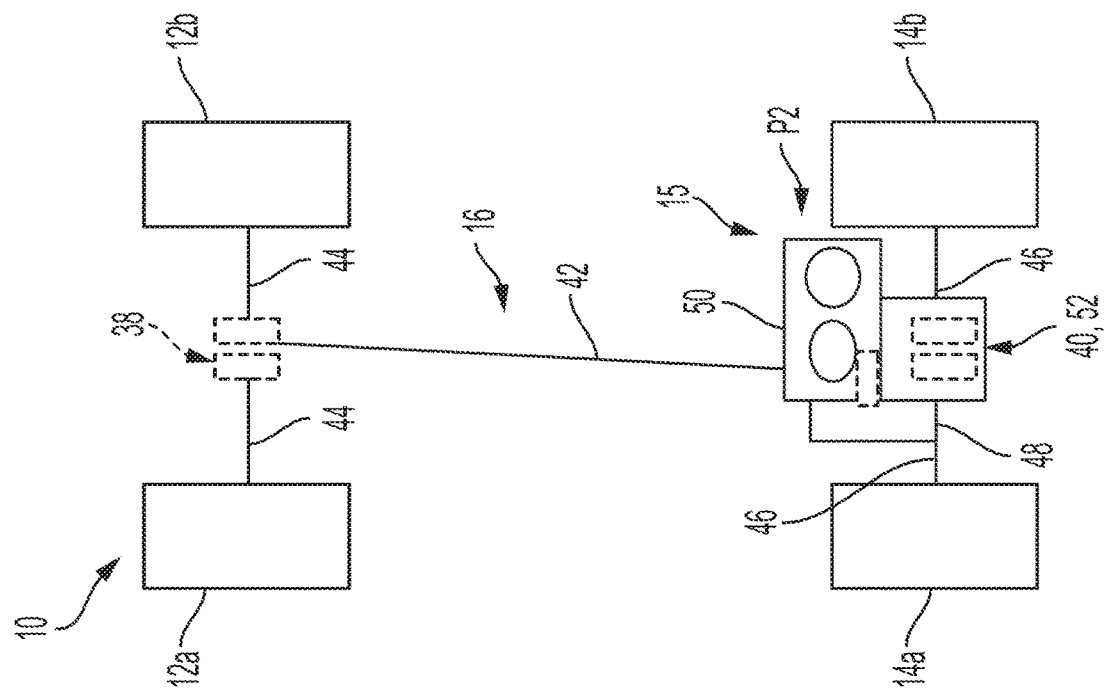
FIG. 20A is a schematic view of the powertrain assembly of FIG. 8 having a laterally-extending engine and the driveline assembly of FIG. 8 having front and rear active torque differentials.
Figure 20B:
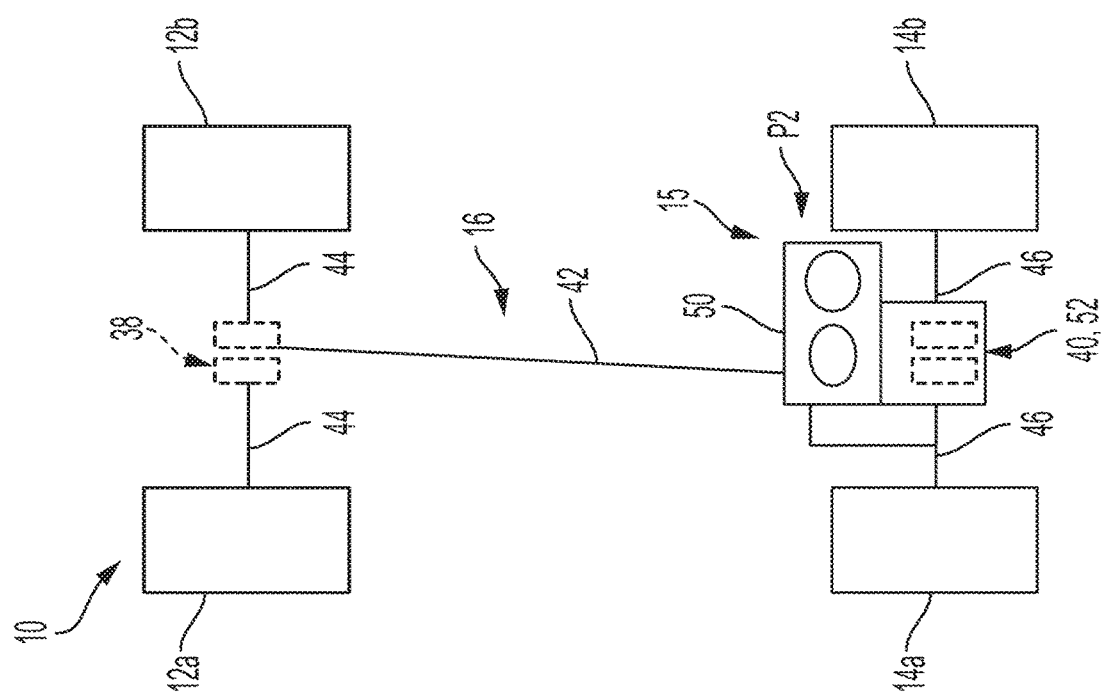
FIG. 20B is a schematic view of the powertrain assembly of FIG. 8 having the laterally-extending engine and the driveline assembly of FIG. 8 having front and rear active torque differentials and the center differential.

With respect to FIGS. 20A and 20B, powertrain assembly 15 is positioned at approximately second position P2 (FIG. 8) such that engine 50 and transmission 52 are directly coupled with rear differential 40 and, as such, rear prop shaft 42b is removed from driveline assembly 16. As such, in such configurations, prop shaft 42 may define a one-piece prop shaft extending between powertrain assembly 15 and front differential 38.

With respect to the illustrative embodiment of FIG. 20A, front differential 38 of driveline assembly 16 defines an active torque differential and rear differential 40 of driveline assembly 16 also defines an active torque differential. Front active torque differential 38 is operably coupled to transmission 52 through prop shaft 42 and to front ground-engaging members 12 through half shafts 44. Rear active torque differential 40 is directly and operably coupled to transmission 52 and is operably coupled to rear ground-engaging members 14 through half shafts 46.

In the embodiment of FIG. 20A, driveline assembly 16 does not include center differential 48 and, therefore, may not be configured for AWD/4WD. However, in the embodiment FIG. 20B, driveline assembly 16 does include center differential 48 and, as such, is configured for AWD/4WD. Center differential 48 is positioned at approximately second position P2 (FIG. 8) and is operably coupled to or integrated with transmission 52.

The configuration of driveline assembly 16, as shown in FIGS. 20A and 20B, is generally comprised of mechanical components and allows torque to be controlled independently at each ground-engaging member 12, 14. For example, varying and different amounts of torque can be provided simultaneously to each front-ground engaging member 12 and to each rear ground-engaging member 14. In this way, the torque at each ground-engaging member 12a, 12b, 14a, 14b may be different and independently controlled even as each ground-engaging member 12a, 12b, 14a, 14b receives a simultaneous torque input. However, when needed, the torque at each ground-engaging member 12, 14 may be constant/identical.

Figure 21A:
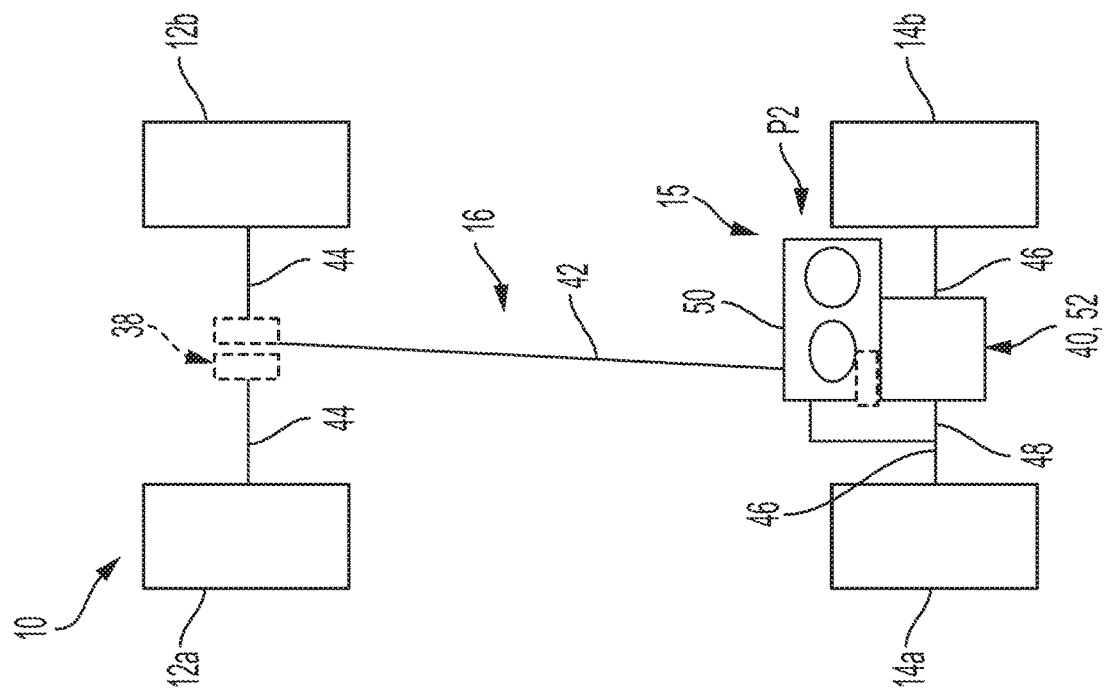
FIG. 21A is a schematic view of the powertrain assembly of FIG. 8 having the laterally-extending engine and the driveline assembly of FIG. 8 having the front active torque differential and the rear open or selectable locking differential.
Figure 21B:
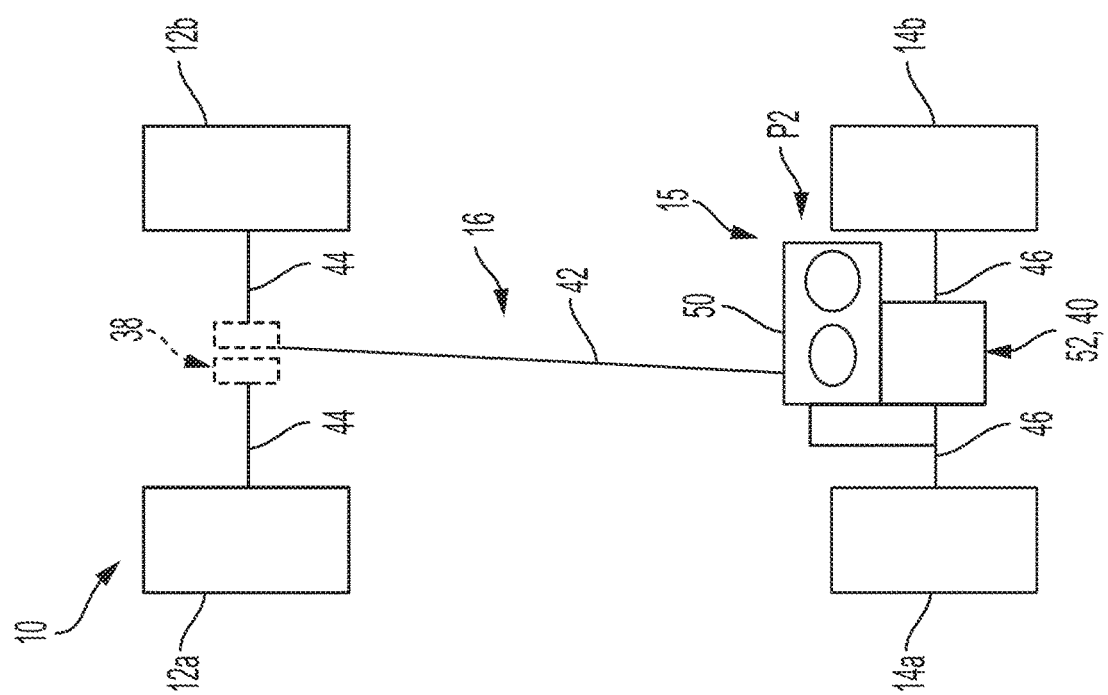
FIG. 21B is a schematic view of the powertrain assembly of FIG. 8 having the laterally-extending engine and the driveline assembly of FIG. 8 having the front active torque differential, the rear open or selectable locking differential, and the center differential.

With respect to FIGS. 21A and 21B, powertrain assembly 15 is positioned at approximately second position P2 (FIG. 8) such that engine 50 and transmission 52 are directly coupled with rear differential 40 and, as such, rear prop shaft 42b is removed from driveline assembly 16.

With respect to the illustrative embodiment of FIG. 21A, front differential 38 of driveline assembly 16 defines an active torque differential and rear differential 40 of driveline assembly 16 defines an open or selectable locking differential. Front active torque differential 38 is operably coupled to transmission 52 through prop shaft 42 and to front ground-engaging members 12 through half shafts 44. Rear open or selectable locking differential 40 is directly and operably coupled to transmission 52 and is operably coupled to rear ground-engaging members 14 through half shafts 46.

In the embodiment of FIG. 21A, driveline assembly 16 does not include center differential 48 and, therefore, may not be configured for AWD/4WD. However, in the embodiment FIG. 21B, driveline assembly 16 does include center differential 48 and, as such, is configured for AWD/4WD. Center differential 48 is positioned at approximately second position P2 (FIG. 8) and is operably coupled to or integrated with transmission 52.

The configuration of driveline assembly 16, as shown in FIGS. 21A and 21B, is generally comprised of mechanical components and allows torque to be controlled independently at each front ground-engaging member 12 but may maintain the same torque at both rear ground-engaging members 14. In this way, the torque at each front ground-engaging member 12a, 12b may be different from each other and different from the torque at rear ground-engaging members 14. However, when needed, the torque at all ground-engaging members 12, 14 may be constant/identical.

Figure 22B:
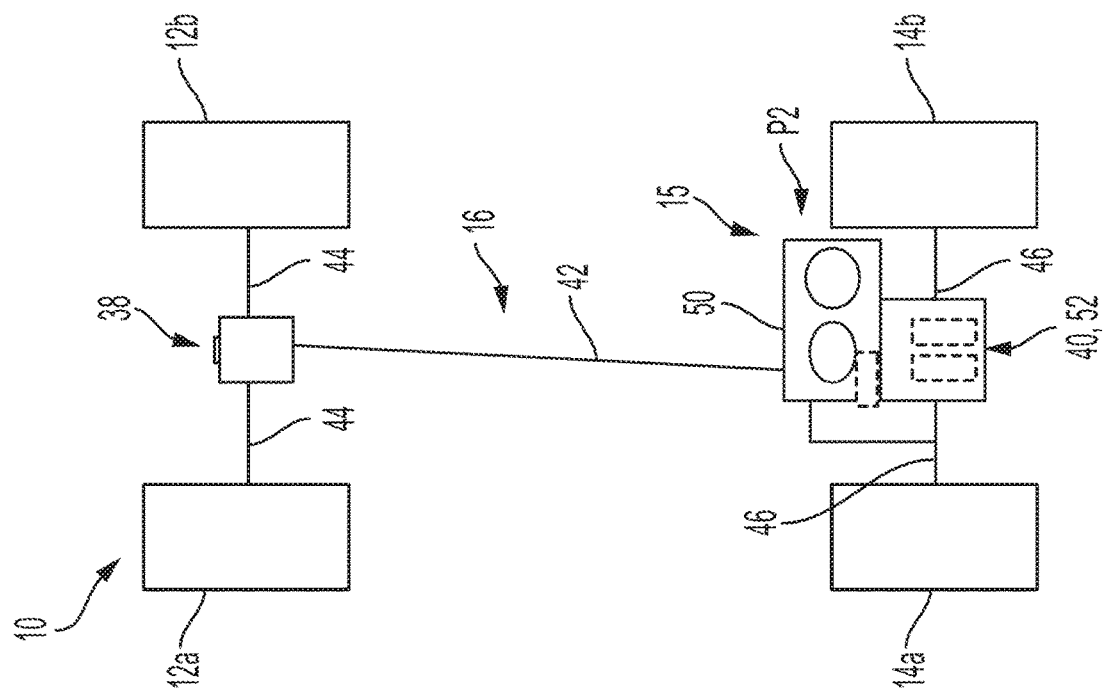
FIG. 22B is a schematic view of the powertrain assembly of FIG. 8 having the laterally-extending engine and the driveline assembly of FIG. 8 having the front open or selectable locking differential, the rear active torque differential, and the center differential.
Figure 22A:
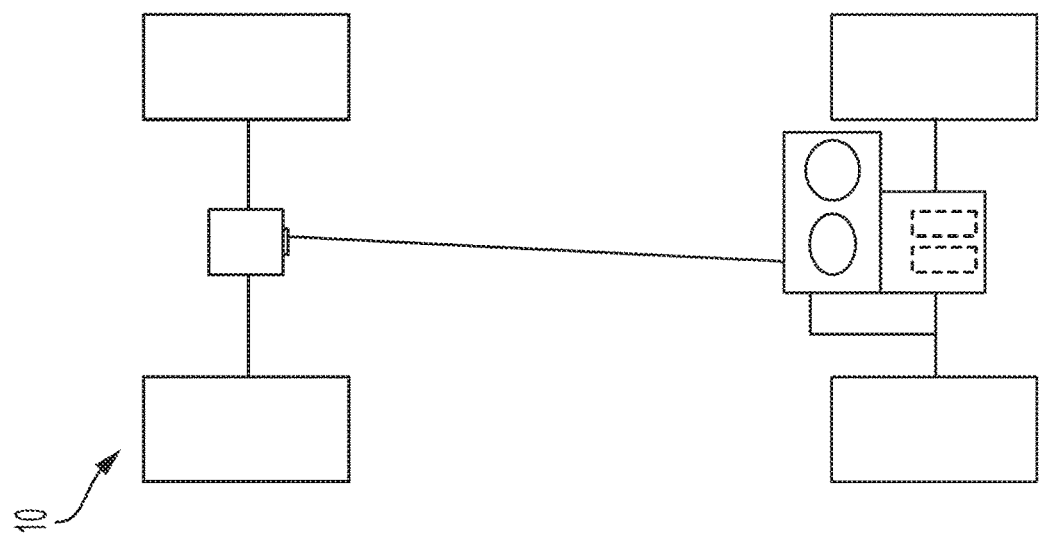
FIG. 22A is a schematic view of the powertrain assembly of FIG. 8 having the laterally-extending engine and the driveline assembly of FIG. 8 having the front open or selectable locking differential and the rear active torque differential.

With respect to FIGS. 22A and 22B, powertrain assembly 15 is positioned at approximately second position P2 (FIG. 8) such that engine 50 and transmission 52 are directly coupled with rear differential 40 and, as such, rear prop shaft 42b is removed from driveline assembly 16. As such, in the configuration, prop shaft 42 may define a one-piece prop shaft extending between powertrain assembly 15 and front differential 38.

With respect to the illustrative embodiment of FIG. 22A, front differential 38 of driveline assembly 16 defines an open or selectable locking differential and rear differential 40 of driveline assembly 16 defines an active torque differential. Front open or selectable locking differential 38 is operably coupled to transmission 52 through prop shaft 42 and to front ground-engaging members 12 through half shafts 44. Rear active torque differential 40 is directly and operably coupled to transmission 52 and is operably coupled to rear ground-engaging members 14 through half shafts 46.

In the embodiment of FIG. 22A, driveline assembly 16 does not include center differential 48 and, therefore, may not be configured for AWD/4WD. However, in the embodiment FIG. 22B, driveline assembly 16 does include center differential 48 and, as such, is configured for AWD/4WD. Center differential 48 is positioned at approximately second position P2 (FIG. 8) and is operably coupled to or integrated with transmission 52.

The configuration of driveline assembly 16, as shown in FIGS. 22A and 22B, is generally comprised of mechanical components and allows torque to be controlled independently at each rear ground-engaging member 14 but may maintain the same torque at both front ground-engaging members 12. In this way, the torque at each rear ground-engaging member 14a, 14b may be different from each other and different from the torque at front ground-engaging members 12. However, when needed, the torque at all ground-engaging members 12, 14 may be constant/identical.

Figure 23A:
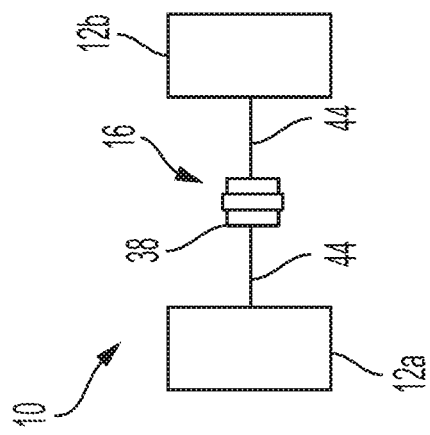
FIG. 23A is a schematic view of the powertrain assembly of FIG. 8 having the laterally-extending engine and the driveline assembly of FIG. 8 having front and rear active torque electronic differentials.
Figure 23A:
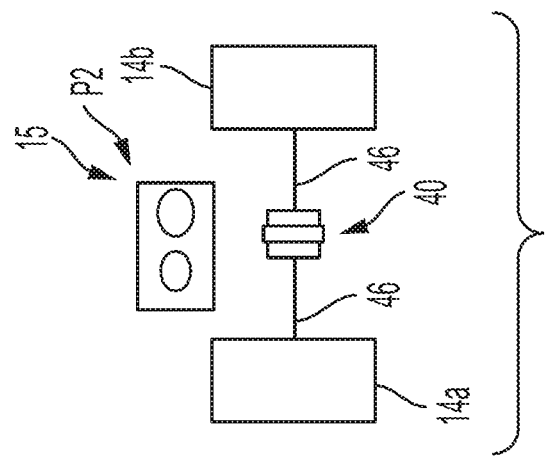
Figure 23B:
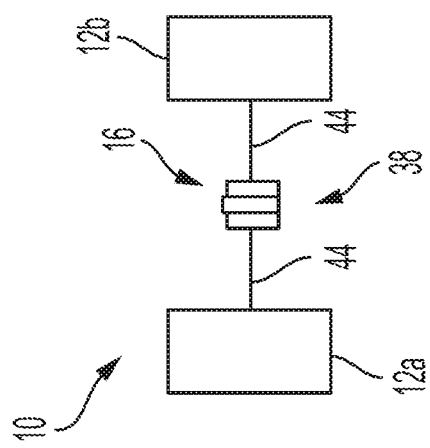
FIG. 23B is a schematic view of the powertrain assembly of FIG. 8 having the laterally-extending engine and the driveline assembly of FIG. 8 having the front active torque electronic differential and the rear active torque differential.
Figure 23B:
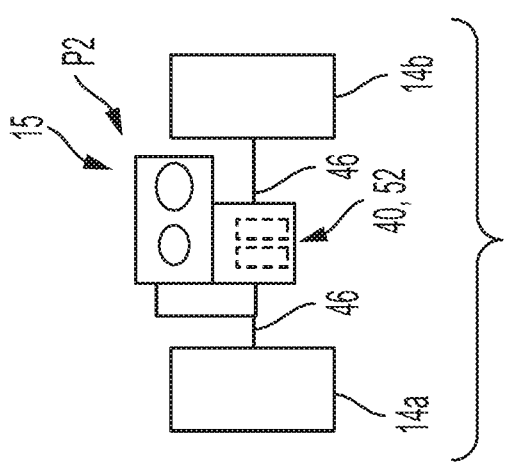
Figure 23C:
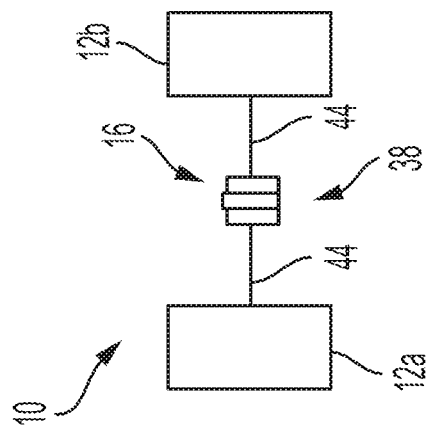
FIG. 23C is a schematic view of the powertrain assembly of FIG. 8 having the longitudinally-extending engine and the driveline assembly of FIG. 8 having the front active torque electronic differential and the rear open or selectable locking differential.
Figure 23C:
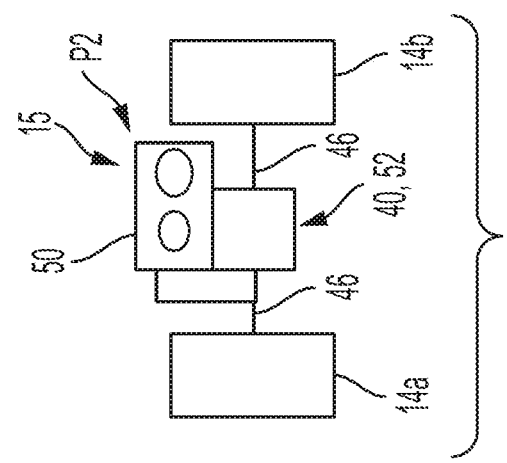

With respect to FIGS. 23A-23C, powertrain assembly 15 is positioned at second position P2 (FIG. 8). Batteries may be included with powertrain assembly 15 but are not shown and may be positioned anywhere on vehicle 10. With respect to the illustrative embodiment of FIG. 23A, front differential 38 of driveline assembly 16 defines an active torque electronic differential and rear differential 40 of driveline assembly 16 defines an active torque electronic differential. In this embodiment, prop shaft 42 may be eliminated from driveline assembly 16 and transmission 52 may be eliminated from powertrain assembly 15. In this way, torque is provided to front and rear ground-engaging members 12, 14 through electronic actuation and control of front and rear active torque electronic differentials 38, 40. In this way, the torque provided at each ground-engaging member 12, 14 may be different from each other even when simultaneously provided to any or all of ground-engaging members 12, 14.

In the embodiment of FIG. 23B, front differential 38 defines an active torque differential and rear differential 40 defines an active torque differential. In this embodiment, prop shaft 42 is eliminated from driveline assembly 16 and powertrain assembly 15 is integrated with rear differential 40 such that rear differential 40 may be integrated with transmission 52. In this embodiment, the torque provided at each ground-engaging member 12, 14 is different from each other even when simultaneously provided to any or all of ground-engaging members 12, 14. However, when needed, the torque at all ground-engaging members 12, 14 may be constant/identical.

In the embodiment of FIG. 23C, front differential 38 defines an active torque electronic differential while rear differential 40 defines an open or selectable locking differential. In this embodiment, prop shaft 42 is eliminated from driveline assembly 16 and powertrain assembly 15 is integrated with rear differential 40 such that rear differential 40 may be integrated with transmission 52. In this embodiment, the torque provided at each ground-engaging member 12, 14 is different from each other even when simultaneously provided to any or all of ground-engaging members 12, 14. However, when needed, the torque at all ground-engaging members 12, 14 may be constant/identical.

Front-Mounted Powertrain Assembly—Laterally-Extending Engine

Figure 24:
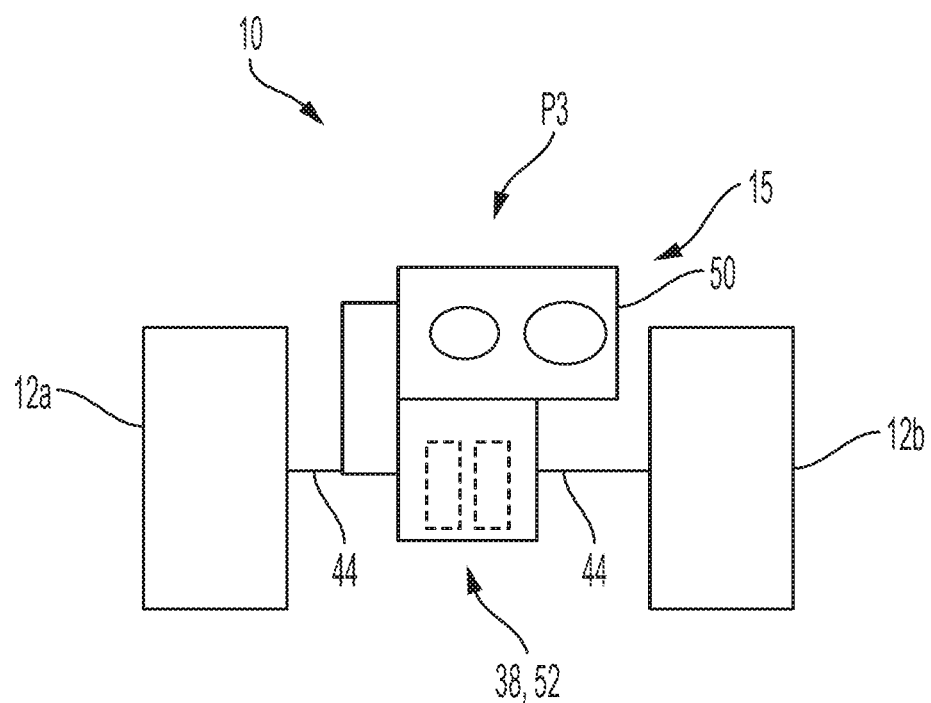
FIG. 24 is a schematic view of the powertrain assembly of FIG. 8 having a laterally-extending engine supported at a front end of the vehicle of FIG. 1 and the driveline assembly of FIG. 8 having a front active torque differential.
Figure 24:
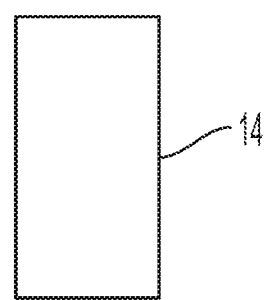

As shown in FIG. 24, powertrain assembly 15 may be positioned at the front of vehicle 10 and supported by front portion 28 of frame assembly 20 at third position P3 (FIG. 8). Engine 50 of powertrain assembly 15 may be laterally-extending and front differential 38 may be integrated with transmission 52. Illustratively, front differential 38 is an active torque differential. A rear electric motor may or may not be provided with powertrain assembly 15. The configuration of FIG. 24 is a front drive configuration and, while shown with three ground-engaging members 12, 14, may be applicable to vehicles having any number of ground-engaging members 12, 14.

In the embodiments disclosed herein and shown in FIGS. 16A-23C, it is apparent that a mechanical or electromechanical AWD driveline can use clutches 80 to control torque distribution to any of ground-engaging members 12, 14. These embodiments of driveline assembly 16 of FIGS. 16A-23C also may assist or otherwise affect steering functionality through torque distribution (e.g., reducing torque on the inner ground-engaging members and increasing torque on the outer ground-engaging members) and could potentially reduce steering wheel force in such a way that a conventional power steering device or assembly may be omitted from vehicle 10. More particularly, electric motors may be positioned on the steered axle(s), in combination with at least one torque sensor, and torque may be used to assist steering instead of a power steering unit on the steering shaft. As such, the steering assembly of vehicle 10 may be a non-power steering assembly because, instead of steering assistance with a power steering unit, steering assistance may be provided through torque distribution between ground-engaging members 12, 14, as shown in FIGS. 9A and 9B. The removal or omission of a conventional power steering assembly may reduce the weight of vehicle 10 and also simplify driveline assembly 16 and/or powertrain assembly 15.

Electric or Hybrid Powertrain Assembly and Driveline Assembly

Figure 25:
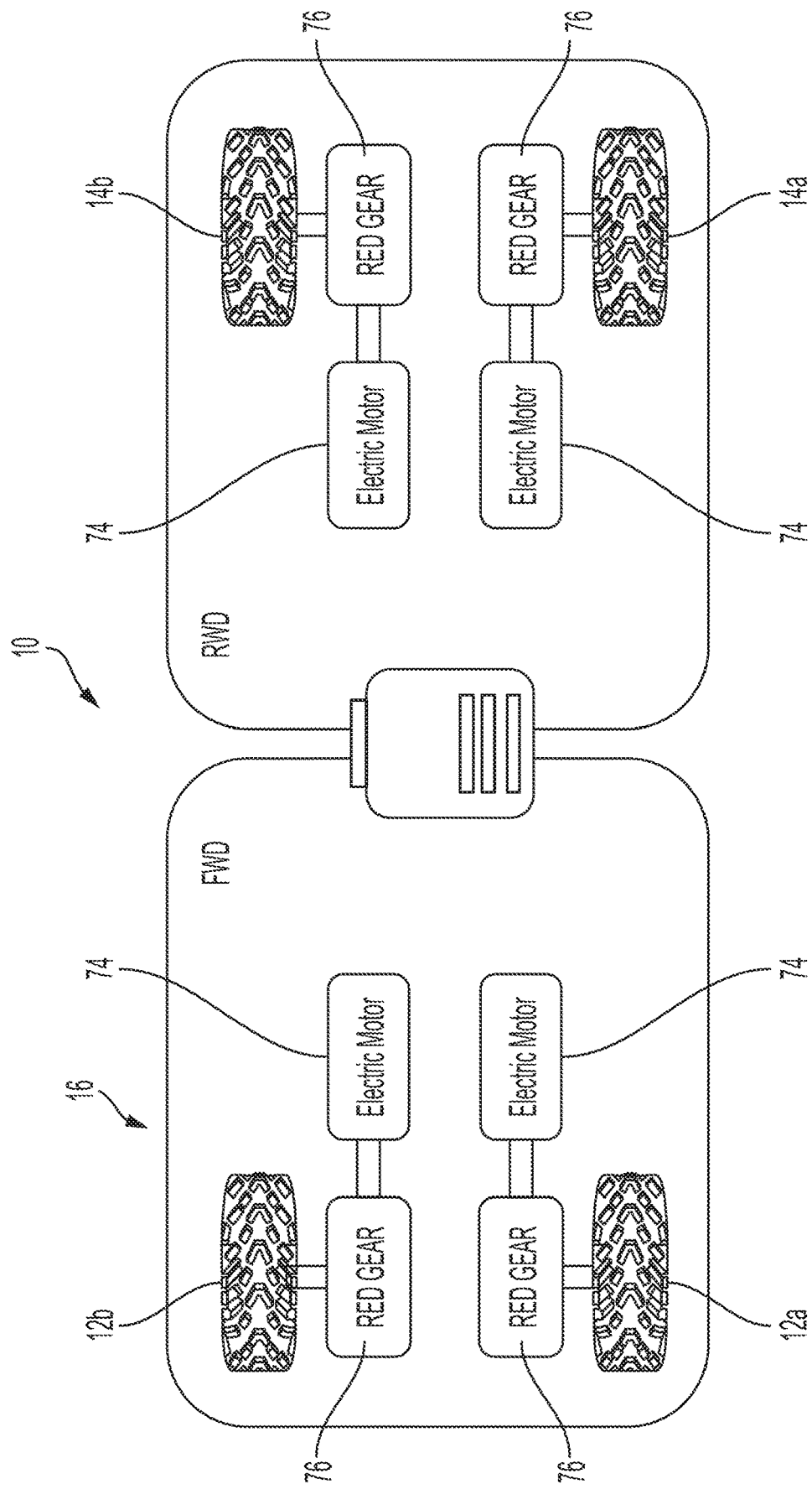
FIG. 25 is a schematic view of an alternative driveline assembly from that of FIG. 8 and defining an all-electric driveline assembly including electric motors and reduction gears at each ground-engaging member.

As shown in FIG. 25, powertrain assembly 15 and driveline assembly 16 may be electrically operated and configured to allow for varying torque distribution at each of ground-engaging members 12, 14. In the embodiment of FIG. 25, each of front ground-engaging members 12a, 12b may include an individual electric motor 74 operably coupled to a reduction gear 76. In this way, electric motor 74 may be controlled by control system 60 (FIG. 8) and configured to operate reduction gear 76 at each front ground-engaging member 12 in order to provide the desired torque thereto.

Additionally, and still referring to FIG. 25, each of rear ground-engaging members 14a, 14b may include individual electric motors 74 and reduction gears 76 for controlling torque at each individual rear ground-engaging member 14a, 14b. In this way, the embodiment of FIG. 25 provides dedicated electric motors 74 at each of ground-engaging members 12, 14 for applying torque individually to each ground-engaging member 12, 14.

For example, if vehicle 10 includes the electric driveline assembly 16 of FIG. 25 and the operator desires to turn vehicle 10 to the right, control system 60 (FIG. 8) may receive a steering input or other inputs from various sensors, systems, or components of vehicle 10 to determine that vehicle 10 should turn to the right. Based on the inputs, control system 60 may signal or otherwise control electric motors 74 at each ground-engaging member 12, 14 to increase or decrease the torque output to the corresponding ground-engaging member 12, 14. For instance, when turning to the right, control system 60 may decrease the torque applied to the inner or right ground-engaging members 12*b*, 14*b* but increase the torque applied to the outer or left ground-engaging members 12*a*, 14*a* to support steering/turning vehicle 10 to the right.

In this way, driveline assembly 16 of FIG. 25 may assist steering functionality through torque distribution and could potentially reduce steering wheel force in such a way that a conventional power steering device or assembly may be omitted from vehicle 10. Additionally, the all-electric driveline assembly 16 may allow vehicle 10 to handle a zero-radius turn.

Pitch and Roll

Driveline assembly 16 of FIG. 25 may minimize or stabilize pitch (end-over-end) and pitch-over or roll (sideways roll or lean) conditions during jumps via the inertia of ground-engaging members 12 and/or 14. More particularly, and as shown in FIGS. 26-30, when driveline assembly 16 includes individual electric motors 74 on the two ground-engaging members on the same axle, accelerometer 70 of control system 60 may detect pitch and roll angles and also detect jumps through detected or measured vertical acceleration. Control unit 62 may be configured to execute an algorithm to accelerate or decelerate (i.e., adjust torque) any of ground-engaging members 12, 14 to create momentum to stabilize (in terms of pitch and roll) vehicle 10 during a jump. For example, various operating modes may include a predetermined or variable maximum angle, where a beginner operating mode of vehicle 10 may be programmed or otherwise configured to keep frame assembly 20 generally leveled through a jump while an advanced or experienced operating mode of vehicle 10 may only allow control system 60 to intervene at angles above a predetermined value. In this way, control system 60 and the configuration of driveline assembly 16 of FIG. 25 may allow for automatic roll stabilization or through a mere operator input (e.g., the operator selecting the operating mode enables varying levels of torque control over driveline assembly 16 based on the experience level of the operator).

Figure 26:
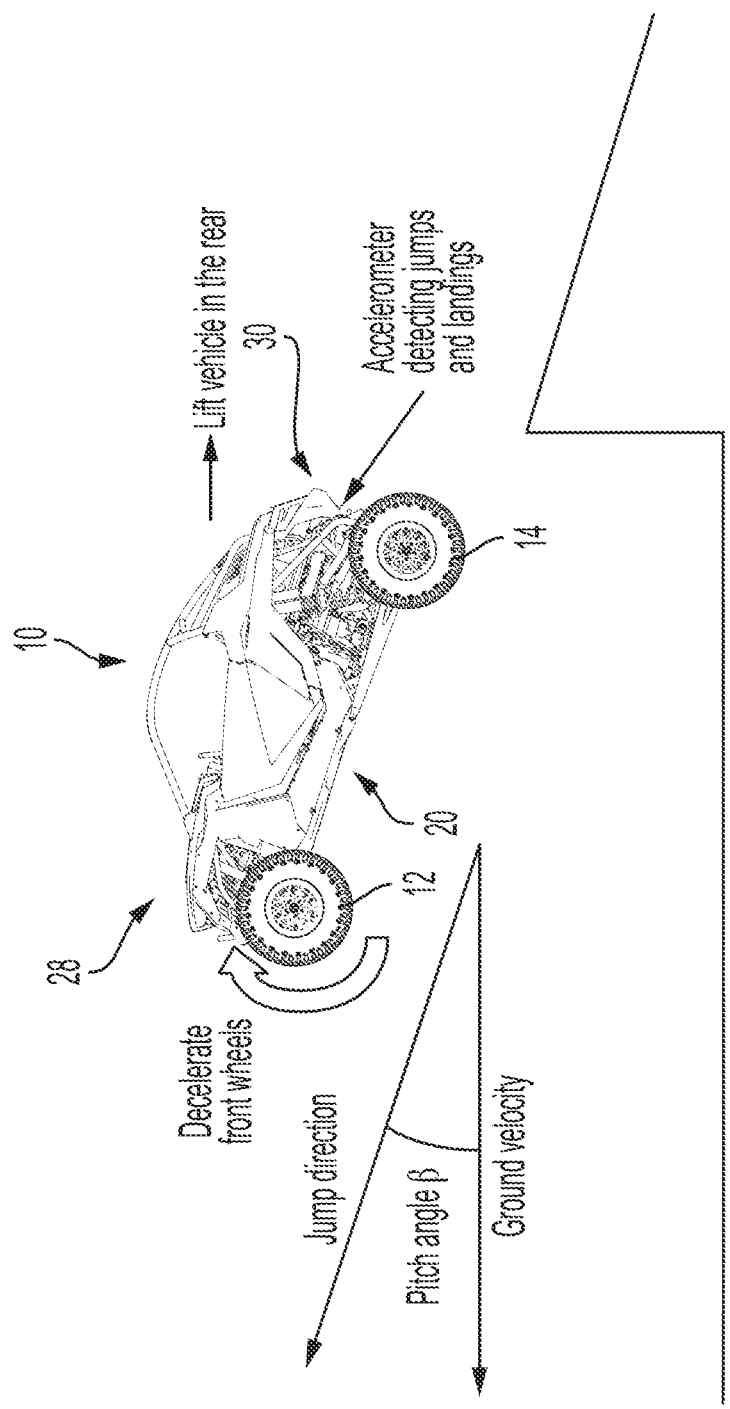
FIG. 26 is a left side view of the vehicle of FIG. 1 during a jump with a positive pitch angle.

As shown in FIG. 26, if vehicle 10 is on a positive pitch angle (i.e., front portion 28 of frame assembly 20 is angled upwardly or at a greater vertical height relative to rear portion 30), both front ground-engaging members 12 may be decelerated (i.e., torque is decreased) to reduce a pitch angle β (defined as the angle of the ground velocity relative to the jump direction). By decelerating front ground-engaging members 12, vehicle 10 may lift at rear portion 30. Accelerometer 70 (FIG. 30) may be used to detect jumps and landings.

Figure 27:
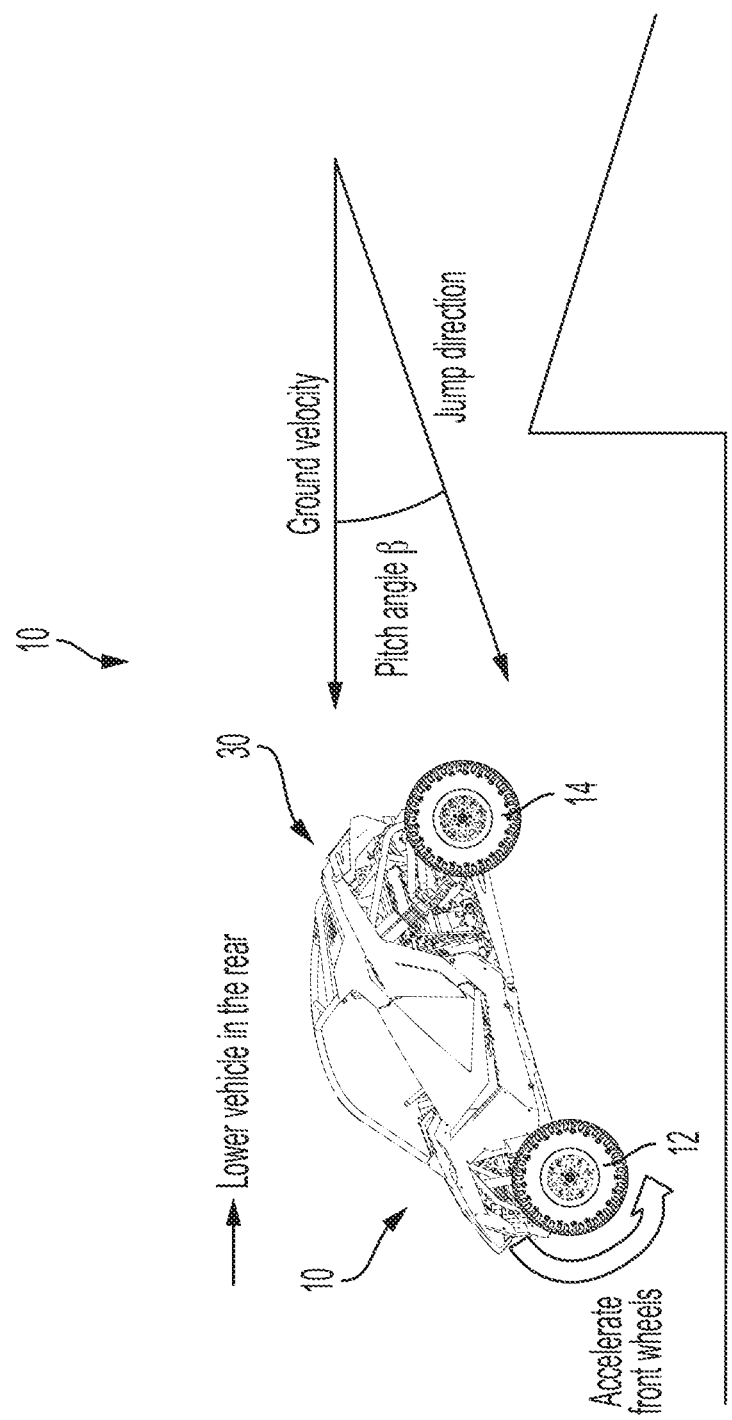
FIG. 27 is a left side view of the vehicle of FIG. 1 during a jump with a negative pitch angle.

Conversely, as shown in FIG. 27, if vehicle 10 is on a negative pitch angle (i.e., front end 28 of frame assembly 20 is angled downwardly or at a lesser vertical height relative to rear portion 30), both front ground-engaging members 12 may be accelerated (i.e., torque is increased) to increase pitch angle (β. By accelerating front ground-engaging members 12, vehicle 10 may be lifted at front portion 28 (i.e., lowered at rear portion 30).

Figure 28:
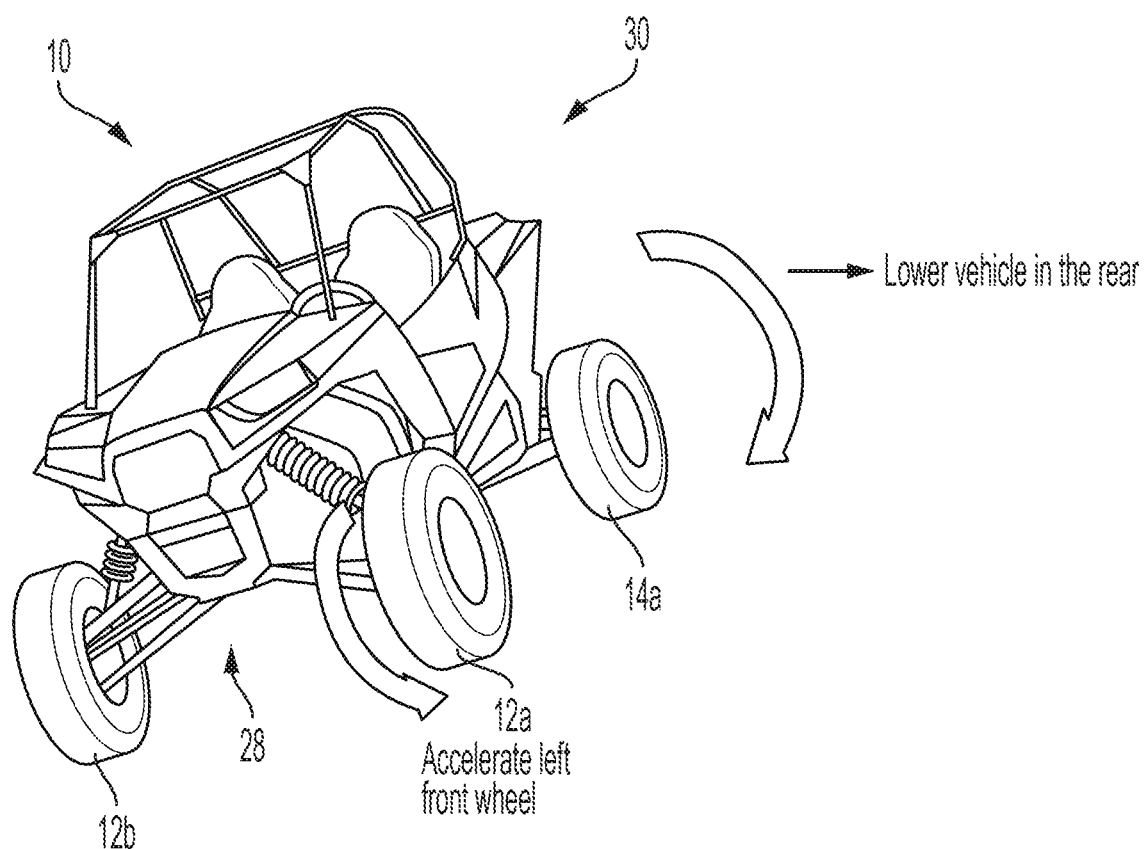
FIG. 28 is a front left perspective view of the vehicle of FIG. 1 when tipped to the right.
Figure 29:
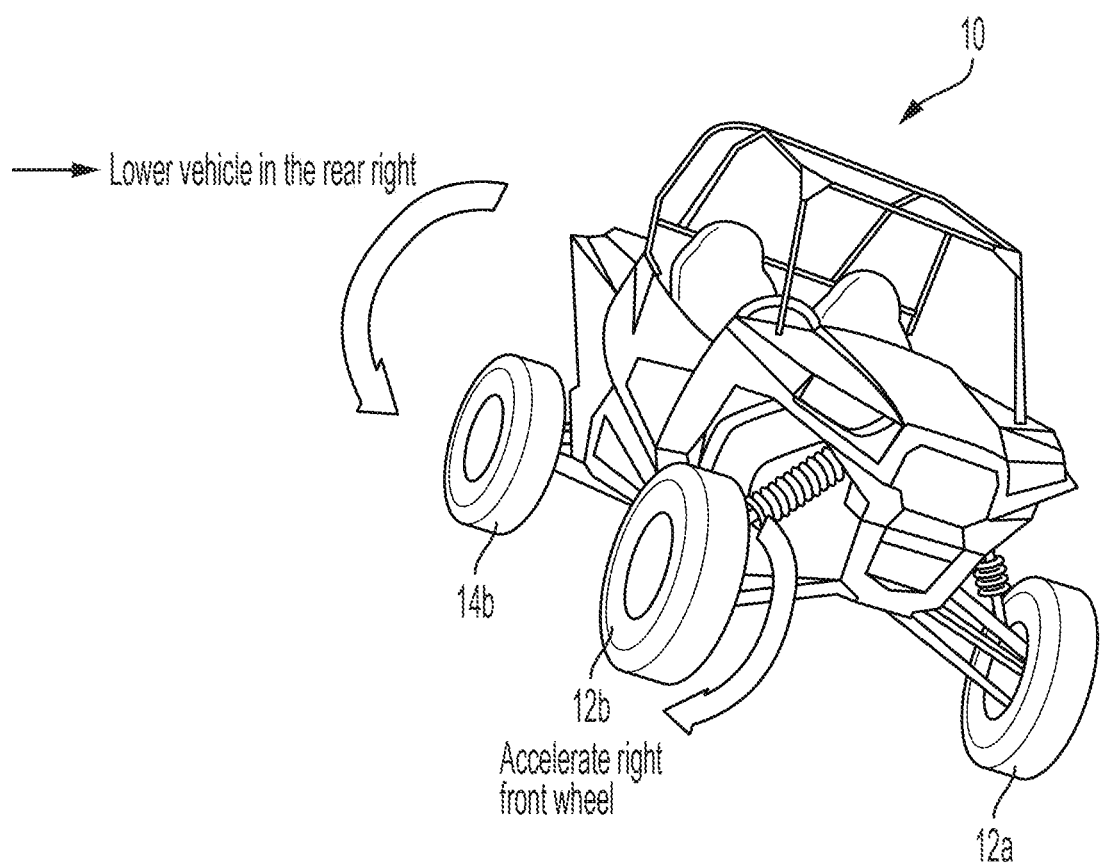
FIG. 29 is a front right perspective view of the vehicle of FIG. 1 when tipped to the left.

Referring to FIGS. 28 and 29, if a vehicle roll or tip is detected (e.g., via gyroscope 72) (FIG. 30), control system 60 may be configured to accelerate at least one ground-engaging member 12, 14 to decrease the roll angle. For example, as shown in FIG. 28, if it is detected that vehicle 10 is tipped to the right, front left ground-engaging member 12*a* may be accelerated to lower vehicle 10 at rear left ground-engaging member 14*a*. After acceleration of front left ground-engaging member 12*a* levels out the roll range, vehicle 10 is further stabilized using the pitch control disclosed with respect to FIG. 30. When vehicle 10 includes four ground-engaging members 12, 14 and driveline assembly 16 includes electric motors 74 on each of ground-engaging members 12, 14, roll and pitch stabilization could be realized at the same time.

Conversely, and as shown in FIG. 29, if it is detected that vehicle 10 is tipped to the left, front right ground-engaging member 12*b* may be accelerated to lower vehicle 10 at rear right ground-engaging member 14*b*. After acceleration of front right ground-engaging member 12*b* levels out the roll range, vehicle 10 is further stabilized using the pitch control disclosed with respect to FIG. 30.

Figure 30:
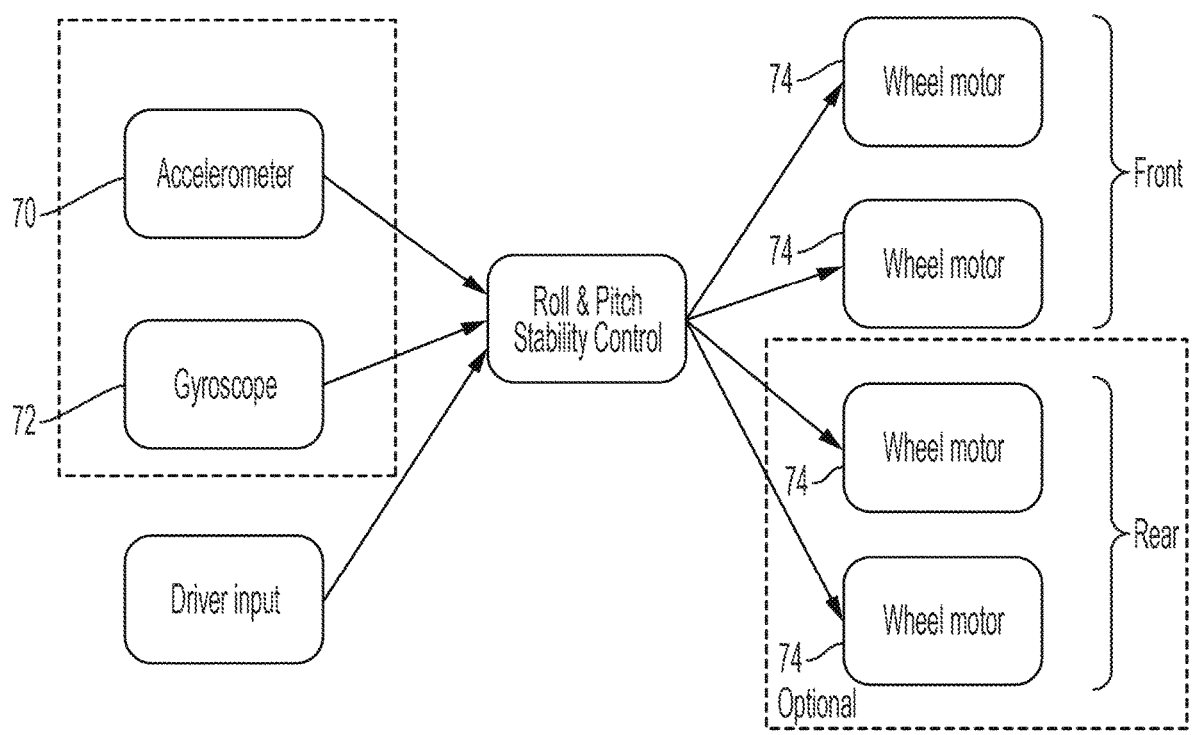
FIG. 30 is a schematic view of a control configuration for operation of the driveline assembly of FIG. 25 during pitch and roll conditions.

As shown in FIG. 30, the pitch and roll stability control feature or module of control system 60 (e.g., control unit 62) may receive inputs from various sensors, such as accelerometer 70 and gyroscope 72, as well as an input from the operator, such as through display 90 in operator area 34. Based on such inputs, the pitch and roll stability control module provides torque commands to any of electric motors 74 at front and/or rear ground-engaging members 12, 14. It is envisioned that the pitch and roll stability control module will provide torque commands to accelerate front left or right ground-engaging members 12*a*, 12*b*, however, the pitch and roll stability control module of control system 60 also may provide torque commands to electric motors 74 at any of rear left and right ground-engaging members 14*a*, 14*b*. It may be appreciated that the pitch and roll stability control feature of FIG. 30 may be used with any embodiment of driveline assembly 16 disclosed herein, including those having clutch packs 80, open or selectable locking differentials, etc.

Rock Crawling Mode

Figure 31:
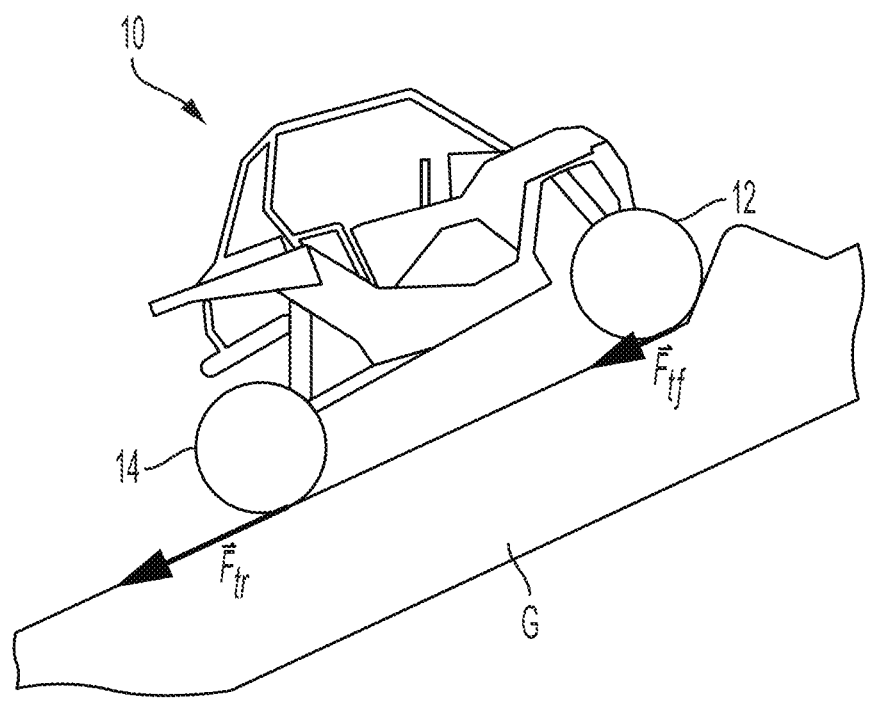
FIG. 31 is a schematic view of a prior art vehicle when crawling or traveling over an obstacle, such as a rock.
Figure 32:
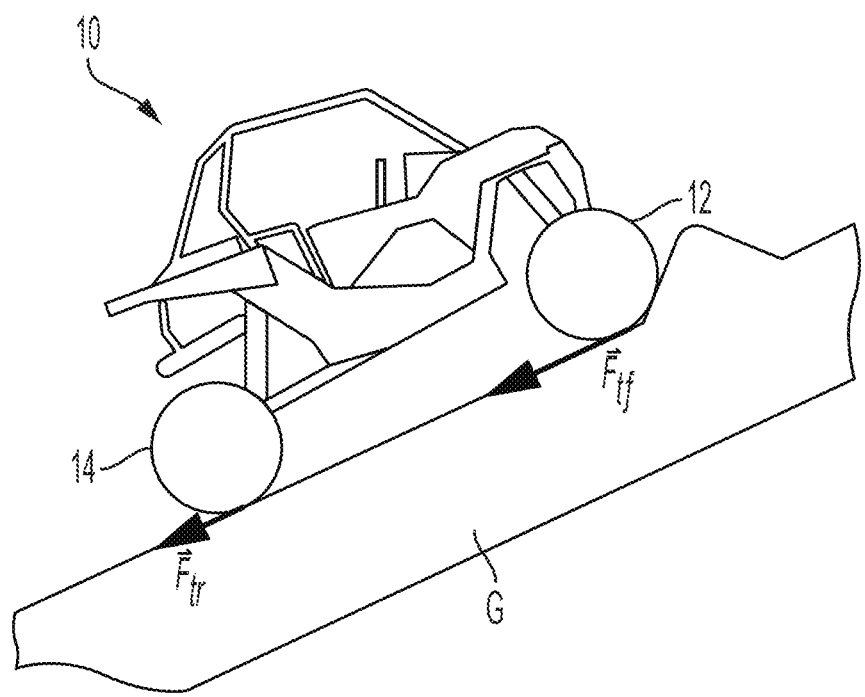
FIG. 32 is a schematic view of the vehicle of FIG. 1 when crawling or traveling over the obstacle of FIG. 31.

Referring to FIGS. 31 and 32, because vehicle 10 is configured for off-road terrain, vehicle 10 is capable of crawling over various objects, such as rocks. In various prior art AWD vehicles, more torque may be provided to the rear wheels than to the front wheels, which makes the vehicle feel like a rear-wheel drive vehicle. The front wheels in such prior art vehicles only provide tractive forces when the rear wheels slip. In a situation where the operator of the prior art vehicle wants/needs to travel over a large obstacle (e.g., a rock), such vehicle may be only driven by the rear wheels, meaning that the front wheels are pushed over the obstacle. In other words, the tractive force of the front wheels ($F_{tf}$) is less than the tractive force of the rear wheels ($F_{tr}$). In such a prior art vehicle, if the vehicle is pushed across an obstacle by the rear wheels, the front wheels tend to lose contact with the ground G due to a moment around the rear axle. Therefore, the operator may lose control over the vehicle.

However, utility vehicle 10 of the present disclosure, uses its torque vectoring and biasing capabilities to overcome this deficiency of various prior art vehicles. More particularly, and as shown in FIG. 32, because vehicle 10 can control the tractive forces on each ground-engaging member 12, 14 and/or axles 44, 46 individually, the torque to each ground-engaging member 12, 14 and axle 44, 46 is distributed for various driving or operating conditions and situations. When traveling over an obstacle, such as a rock, the tractive forces are maximized at front ground-engaging members 12 and axles 44 compared to rear ground-engaging members 14 and axles 46, such that $F_{tf}$ is greater than $F_{tr}$. As such, utility vehicle 10 is pulled over the rock or obstacle by front ground-engaging members 12, rather than being pushed over it by rear ground-engaging members 14, as is done in various prior art vehicles. The tractive forces on front ground-engaging members 12 are adapted based on driving and environmental (e.g., ground surface G) conditions. Additionally, because the traction forces or torque at each ground-engaging member 12, 14 may be individually controlled, if front ground-engaging members 12 start to slip when traveling over an obstacle, torque can be increased at rear ground-engaging members 14.

Hill Climb Mode

Figure 33:
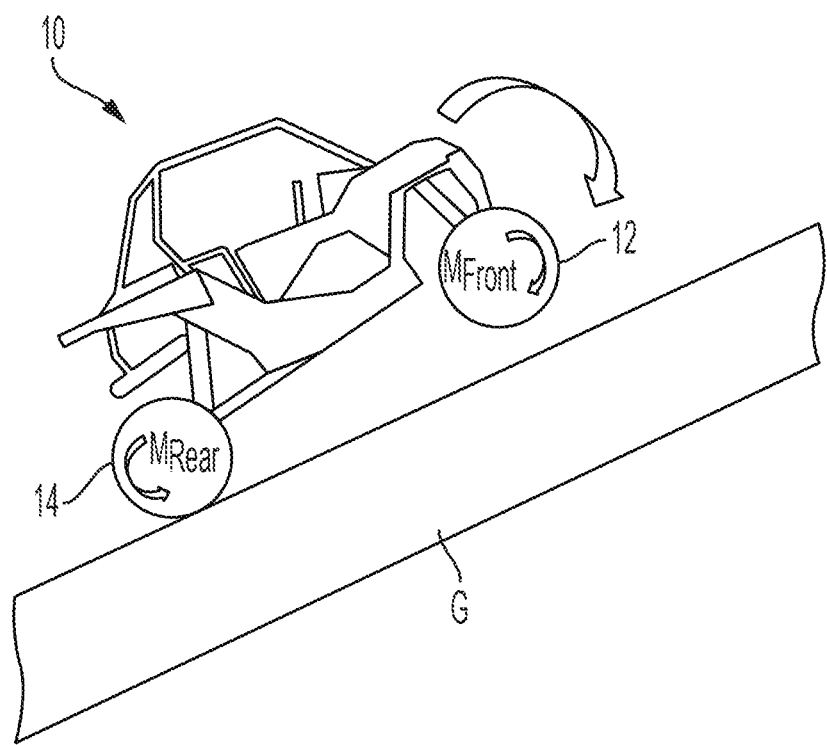
FIG. 33 is a schematic view of the vehicle of FIG. 1 using torque vectoring during a hill climb mode.

The Hill Climb Mode helps vehicle 10 to climb steep slopes. With the torque vectoring and biasing capabilities of vehicle 10, the risk of a roll-over of vehicle 10 when traveling up a steep uphill can be minimized. On various prior art vehicles, it is possible for the vehicle to lose traction at the front axle and roll-overs can occur when the operator engages the accelerator pedal in an uncontrolled manner (e.g., demanding more torque at the rear axle and thereby losing control of the vehicle). However, with vehicle 10 of the present disclosure, and referring to FIG. 33, once traction is lost at front axle 44 and front portion 28 of vehicle 10 starts to lift up from ground surface G, the torque at rear axle 46 is reduced (e.g., braked) immediately so that front portion 28 lowers back to ground surface G. Additionally, more torque is applied to front axle 44 during the Hill Climb Mode through the torque distribution capabilities of vehicle 10. With this torque distribution approach, a faster and more stable climb of hills is possible.

Figure 34:
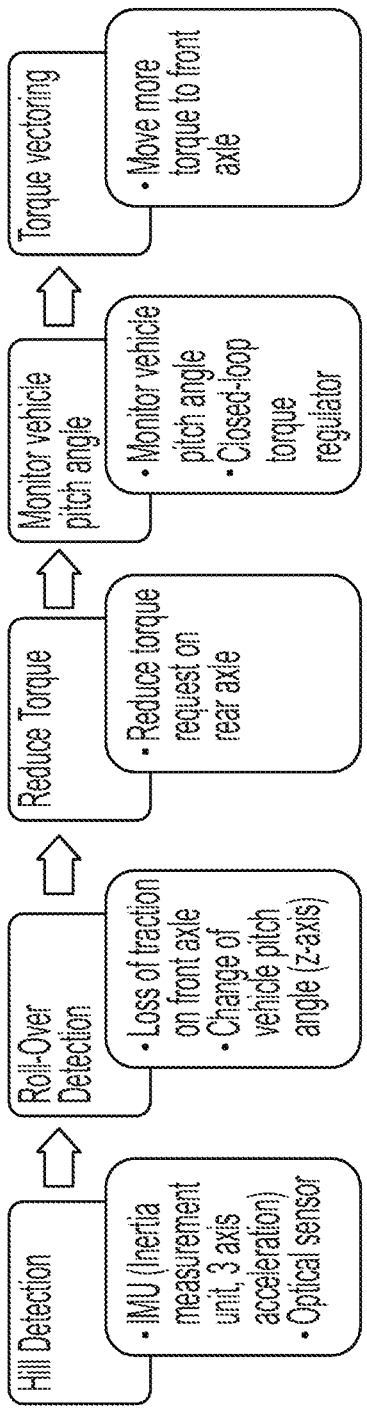
FIG. 34 is a flowchart of the control system of FIG. 1 configured to detect a potential roll-over event or condition.

As shown in FIG. 34, a roll-over event may be detected by control system 60 according to the steps shown. First, using an inertia measurement unit ("IMU") and/or an optical sensor of control system 60, a hill may be detected. Next, loss of traction on front axle 44 and/or a change of vehicle pitch angle β may be detected, signaling a potential roll-over situation. If a hill and a possible roll-over situation are detected, control system 60 sends a command to reduce torque on rear axle 46. Using any of the embodiments of driveline assembly 16 and rear differential 40 disclosed herein, the torque provided to rear ground-engaging members 14 may be reduced. After, control system 60 monitors vehicle pitch angle β and, based on that measurement, may increase or otherwise adjust torque at front axle 44. In this way, torque distribution, as disclosed herein with respect to any of the embodiments of driveline assembly 16, may be used to minimize the risk of a roll-over event, especially when vehicle 10 is climbing a steep hill.

Figure 35:
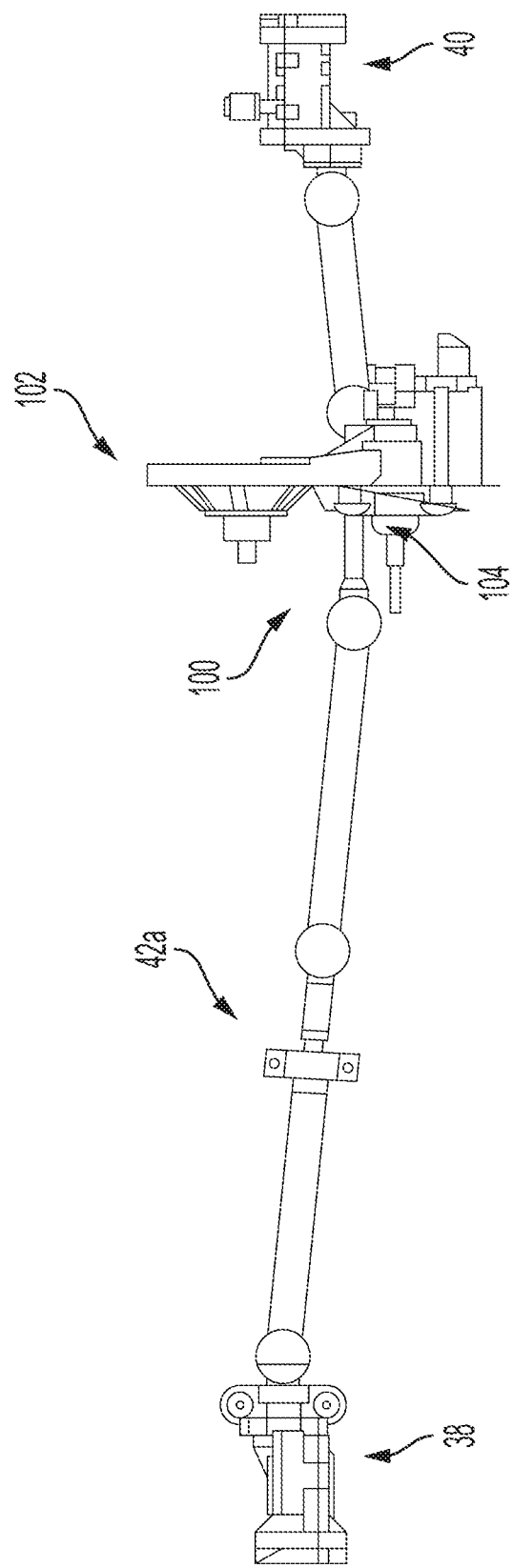
FIG. 35 is a schematic view of an alternative embodiment driveline assembly for the utility vehicle of FIG. 1.
Figure 36B:
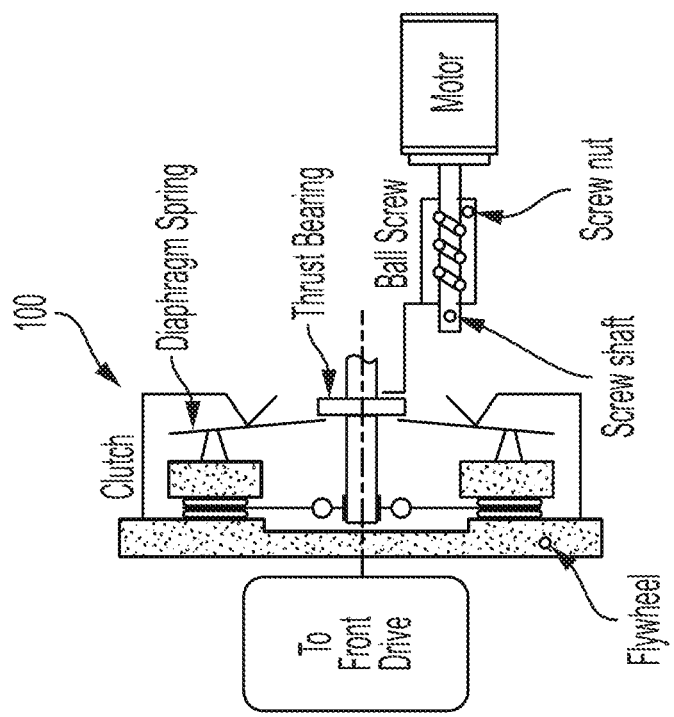
FIG. 36B is a schematic view of an electromechanical actuation system.
Figure 36A:
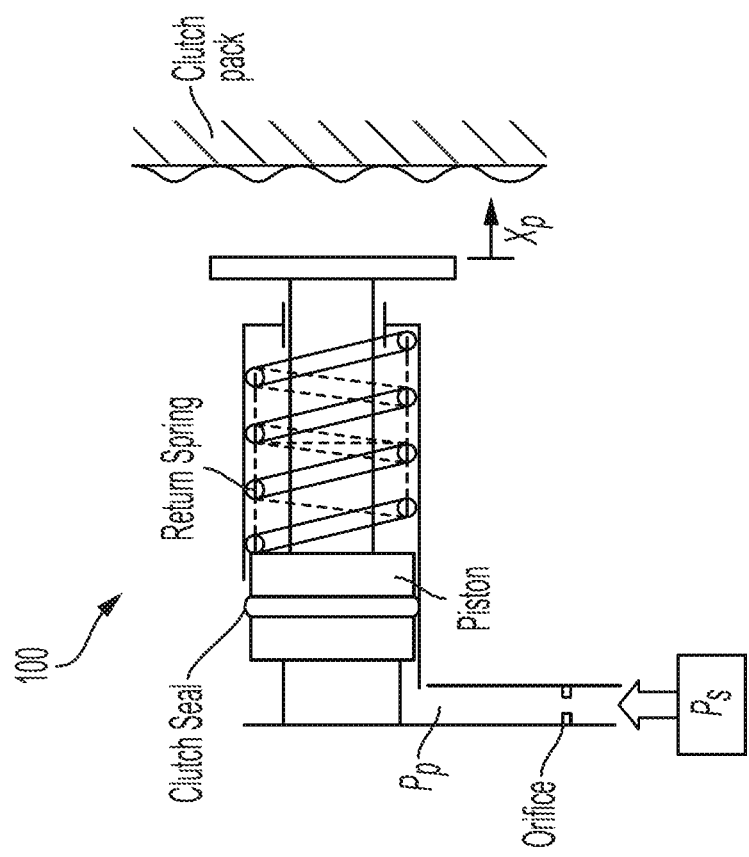
FIG. 36A is a schematic view of an electrohydraulic actuation system.

With respect to FIGS. 35-36B, an electromechanical or electrohydraulic pack or system 100 may be added to powertrain assembly 15 (e.g., at the mechanical front drive output clutch), along with an accompanying sensor (or plurality of sensors), such as a temperature sensor, position sensor, speed sensor, and/or any other sensor for monitoring various parameters. More particularly, an electronically-controlled actuation system 100 may be positioned between a portion of prop shaft 42 (e.g., front prop shaft 42a) and transmission 52. Transmission 52 may include a sub-transmission 102 and electronically-controlled actuation system 100 may be positioned at location 104 of sub-transmission 102, thereby positioning electronically-controlled actuation system 100 intermediate a portion of front prop shaft 42a and sub-transmission 102. Electronically-controlled actuation system 100 may allow for consistent, controlled, and situation-based torque transfer to the front prop shaft and front drive under a plurality of conditions. Typically, mechanically controlled clutches may have inherent sensitivity to materials, life, age, manufacturing variability, temperature, and duty cycle when used as torque-limiting devices. However, by adding electronic oversight and control, consistent torque may be applied, thereby leading to increased driveline performance and increased accuracy in vehicle dynamics. FIG. 36A illustrates electronically-controlled actuation system 100 as an electrohydraulic actuation system and FIG. 36B illustrates electronically-controlled actuation system 100 as an electromechanical actuation system.

System 100 includes inputs such as operator based demand signals (e.g., accelerator pedal input, brake pedal position, status, and/or pressure), vehicle dynamics state (e.g., three-axis accelerations, three-axis rotational rates, cornering, braking, acceleration, and/or airborne status), vehicle driveline configuration state (e.g., two wheel drive, four wheel drive, etc.), vehicle speed, ground speed, rear wheel speed, front wheel speed, and/or the speed of the prop shaft. System 100 is controlled based on one or any combination of the aforementioned inputs according to any of the following methods: (1) Reduction of Peak Torque Transmitted to Front Drive While Vehicle is Airborne; (2) Reduction of the Peak Torque Transmitted to the Front Drive During an Identified State of Significant Shaft Speed Differential Occurs Front to Rear; (3) Increased Application of Torque to the Front Drive Under Low Speed and/or Crawling Conditions; (4) Decreased Application of Torque to the Front Drive Under High Speed or Transient Conditions; and/or (5) Functional State-Based Reduction of Torque Based on Any Vehicle Dynamics Factors. In one configuration, adjustable peak torque slip point control changes the value at which the clutch slips under peak or spike torque transfer events but cannot completely open up a clutch to prevent torque transfer. In other words, it is a variable preload actuation of a primary plate spring for adjusting the center clutch maximum transferrable torque, where the value is controlled by a mechanical spring. An electromechanical linear actuator also may be used. In other configurations, transmittable torque control is continuous from zero to a maximum physical transmitted capability of torque in order to control the amount of torque that can be transmitted to front prop shaft 42s from sub-transmission 102.

Figure 37:
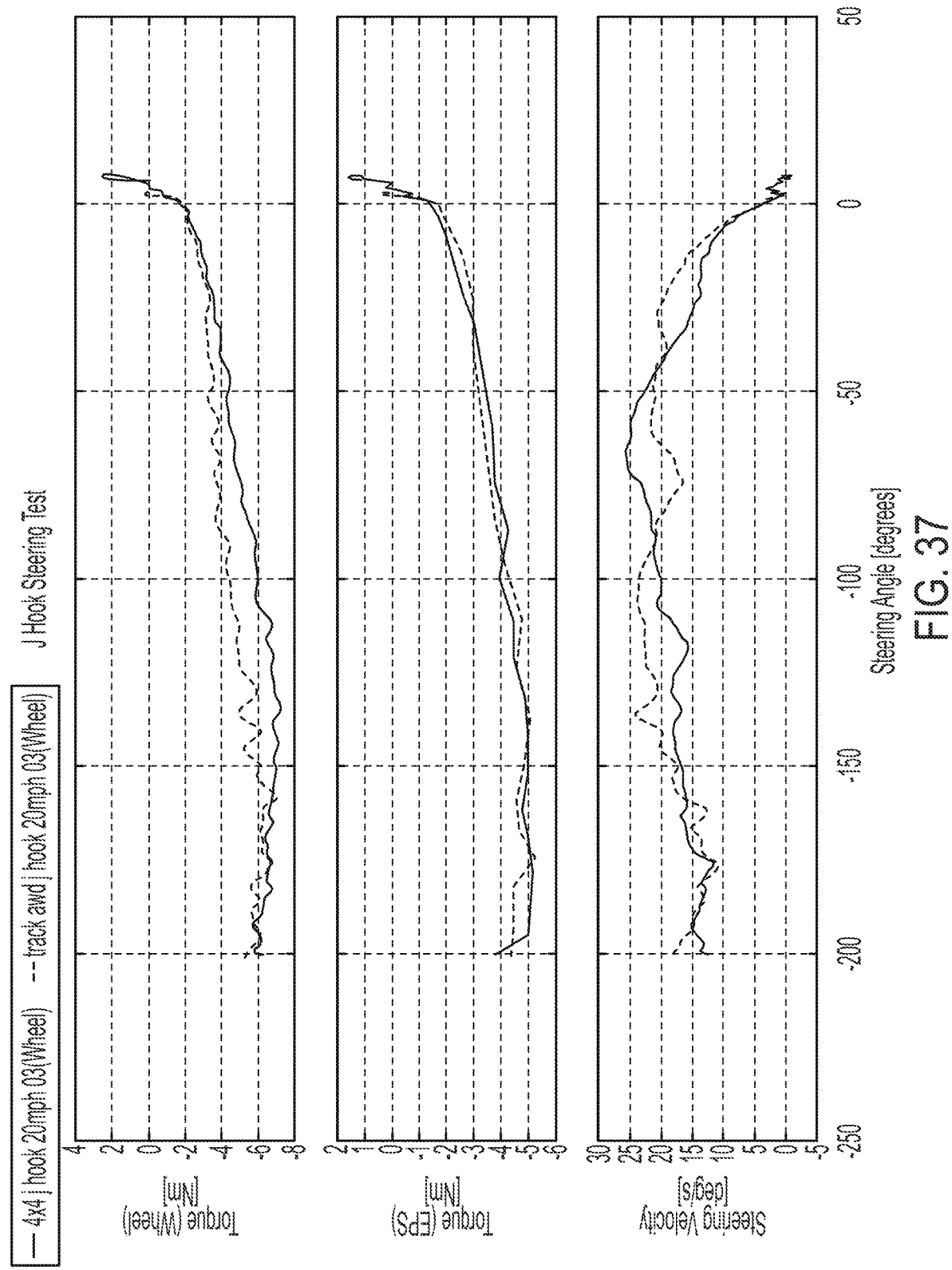
FIG. 37 is a series of graphical representations of steering tests.

Referring now to FIG. 37, if powertrain assembly 15 includes a locked differential front drive 38, the electric power steering ('EPS") assembly may be used to detect that the use of the locked differential and tune the EPS features differently than when the front differential is not locked. For example, with a locked differential, it is possible to increase the steering assist to the torque feels at the steering wheel by the user so it is the same. Additionally, it is possible to tune the steering damping to increase steering tracking. Further, it is possible to tune the return to center differently such that the steering does not return to center as fast due to the forces on the steering system. FIG. 37 illustrates a series of graphical steering test, illustrative of the above disclosure, with steering angle plotted relative to wheel torque, EPS torque, and steering velocity.

The present disclosure may be used in combination with the active agility system disclosed in U.S. Provisional Patent Application Ser. No. 63/013,272, filed Apr. 21, 2020, the complete disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a first front ground-engaging member;
a first axle operably coupled to the first front ground-engaging member;
a second front ground-engaging member;
a second axle operably coupled to the second front ground-engaging member and being axially aligned with the first axle;
at least one rear ground-engaging member;
a first torque altering unit operably coupled to at least one of the first front ground-engaging member, the second front ground-engaging member, or the at least one rear ground-engaging member;
a second torque altering unit operably coupled to the at least one rear ground-engaging member and defined as one of an open differential, a lockable differential, or an active torque differential; and
a control system configured to independently control torque output at each of the first front ground-engaging member, the second front ground-engaging member, and the at least one rear ground-engaging member.

2. The utility vehicle of claim 1, wherein a torque output at the first ground-engaging member is different than a torque output at the second ground-engaging member.

3. The utility vehicle of claim 1, wherein a torque output at one of the first or second ground-engaging members is different than a torque output at the at least one rear ground-engaging member.

4. The utility vehicle of claim 1, wherein the at least one rear ground-engaging member defines a first rear ground-engaging member operably coupled to a third axle and a second rear ground-engaging member operably coupled to a fourth axle, and the second torque altering unit is defined by at least a third clutch member operably coupled to the third axle and a fourth clutch member operably coupled to the fourth axle.

5. The utility vehicle of claim 1, wherein the torque altering unit is defined by a first electric motor operably coupled to the first axle and a second electric motor operably coupled to the second axle.

6. The utility vehicle of claim 1, wherein the torque altering unit is configured to slow a speed of at least one of the first front ground-engaging member, the second front ground-engaging member, and the at least one rear ground-engaging member relative to the other ground-engaging members.

7. The utility vehicle of claim 6, wherein the torque altering unit defines a braking system of the utility vehicle.

8. The utility vehicle of claim 1, wherein the torque altering unit defines a first clutch member operably coupled to the first axle and a second clutch member operably coupled to the second axle.

9. The utility vehicle of claim 1, wherein the torque altering unit defines at least one of a torque vectoring unit and a torque biasing unit.

10. A method of controlling torque for an off-road utility vehicle, comprising:
controlling torque to a first ground-engaging member of the utility vehicle;
controlling torque to a second ground-engaging member of the utility vehicle simultaneously with and independently of controlling torque to the first ground-engaging member;
controlling torque to a third ground-engaging member of the utility vehicle independently of controlling torque to the first and second ground-engaging members; and
detecting a pitch of the vehicle and controlling torque to the first ground-engaging member based upon the detected pitch.

11. The method of claim 10, wherein the first ground-engaging member is a front ground-engaging member of the utility vehicle and the second ground-engaging member is a rear ground-engaging member of the utility vehicle.

12. The method of claim 10, wherein the first ground-engaging member is one of a first front or rear ground-engaging member of the utility vehicle and the second ground-engaging member is one of a second front or rear ground-engaging member of the utility vehicle.

13. The method of claim 10, further comprising:
providing a first clutch member configured for controlling torque to the first ground-engaging member;
providing a second clutch member configured for controlling torque to the second ground-engaging member; and
positioning the first and second clutch members in axial alignment.

14. The method of claim 13, further comprising providing a third clutch member configured for controlling torque to the third ground-engaging member.

15. The method of claim 10, wherein controlling torque to the first ground-engaging member is based upon the first ground-engaging member traveling over an obstacle.

16. The method of claim 10, further comprising detecting a pitch-over condition of the vehicle and controlling torque to the first ground-engaging member based upon the detected pitch-over condition.

17. A driveline assembly for a utility vehicle, comprising:
a front differential configured to be operably coupled to at least one front ground-engaging member of the utility vehicle;
a rear differential configured to be operably coupled to at least one rear ground-engaging member of the utility vehicle; and
a control system operably coupled to the front and rear differentials, wherein the control system is configured to control distribution of torque to each of front and rear ground-engaging members, in combination with braking of at least one of the at least one front-ground-engaging member and the at least one rear ground-engaging member, to affect steering of the utility vehicle.

18. The driveline assembly of claim 17, wherein the control system is configured to control the distribution of torque based upon a steering input provided by a non-power steering assembly.

19. The driveline assembly of claim 17, wherein the control system is configured to control the distribution of torque based upon at least one of steering angle data, yaw rate data, and wheel speed data.

20. The driveline assembly of claim 17, further comprising a center differential operably coupled to the front and rear differentials.

21. The driveline assembly of claim 17, further comprising a prop shaft operably coupled to at least the front differential and a powertrain assembly of the utility vehicle, and the prop shaft defines a single prop shaft based upon a first configuration of the powertrain assembly and a multi-piece prop shaft based upon a second configuration of the powertrain assembly.

22. A method of controlling torque for an off-road vehicle, comprising:
- controlling torque to a first ground-engaging member of the utility vehicle by providing a braking input at the first ground-engaging member;
- controlling torque to a second ground-engaging member of the utility vehicle simultaneously with and independently of controlling torque to the first ground-engaging member;
- controlling torque to a third ground-engaging member of the utility vehicle independently of controlling torque to the first and second ground-engaging members: and
- controlling the distribution of torque to each of the first ground-engaging member, second ground-engaging member and third ground-engaging member based upon at least one of steering angle data, yaw rate data, or wheel speed data.

23. The method of claim 22, further comprising causing an increase in torque at one of the second and third ground-engaging members in response to the braking input at the first ground-engaging member.

* * * * *